(12) United States Patent
Landvater

(10) Patent No.: US 6,609,101 B1
(45) Date of Patent: Aug. 19, 2003

(54) METHOD AND SYSTEM FOR DETERMINING TIME-PHASED PRODUCT SALES FORECASTS AND PROJECTED REPLENISHMENT SHIPMENTS FOR A RETAIL STORES SUPPLY CHAIN

(75) Inventor: Darryl V. Landvater, Williston, VT (US)

(73) Assignee: The Retail Pipeline Integration Group, Inc., Essex Junction, VT (US)

(*) Notice: Subject to any disclaimer, the term of this patent is extended or adjusted under 35 U.S.C. 154(b) by 0 days.

(21) Appl. No.: 09/536,335

(22) Filed: Mar. 25, 2000

Related U.S. Application Data

(60) Provisional application No. 60/126,454, filed on Mar. 26, 1999.

(51) Int. Cl.[7] .................................... G06F 17/60
(52) U.S. Cl. .......................................... 705/10
(58) Field of Search ........................... 705/10

(56) References Cited

U.S. PATENT DOCUMENTS

| | | | |
|---|---|---|---|
| 5,128,861 A | 7/1992 | Kagami et al. | 705/10 |
| 5,168,445 A * | 12/1992 | Kawashima et al. | 364/403 |
| 5,299,115 A | 3/1994 | Fields et al. | 705/10 |
| 5,459,656 A | 10/1995 | Fields et al. | 705/7 |
| 5,832,532 A | 11/1998 | Kennedy et al. | 707/503 |
| 5,845,258 A | 12/1998 | Kennedy | 705/8 |
| 5,953,707 A * | 9/1999 | Huang et al. | 705/10 |
| 6,032,125 A | 2/2000 | Ando | 705/10 |
| 6,341,269 B1 * | 1/2002 | Dulaney et al. | 705/22 |

FOREIGN PATENT DOCUMENTS

| | | |
|---|---|---|
| JP | 407175787 A | 7/1995 |
| JP | 407239884 A | 9/1995 |

OTHER PUBLICATIONS

Landvater, Darry. World Class Production and Inventory Management, John Wiley and Sons, Inc., Second Edition, 1997.*

"Managing the demand chain through managing the information flow: Capturing 'moments of information,'" by Rhonda R. Lummus and Robert J. Vokurka, Production & Inventory Management Journal, v40n1, pp. 16–20, First Quarter, 1999.

"Effective inventory management starts at the store," Drug Store News, v20, n12, p52, Aug. 3, 1998.

"Forecast Views: Retailers And Vendors Are Starting To Collaborate To Take Guesswork Out of Ordering By Refining Planning Methods," by Linda Purpura, Supermarket News, v48, n23, p61(1), Jun. 8, 1998.

"Order Planning and Explosion" *MRPII Standard System—A Handbook For Manufacturing Software Survival*, by Darryl V. Landvater and Christopher D. Gray, Chapter 7, pp. 75–82. (1995).

* cited by examiner

Primary Examiner—Tariq R. Hafiz
Assistant Examiner—Johnna Stimpak
(74) Attorney, Agent, or Firm—Downs Rachlin Martin PLLC

(57) ABSTRACT

A time-phased forecasting and replenishment system (20) for retail organizations which can be used for inventory management and financial management. One or more computers (28) create time-phased plans for one or more retail facilities, such as various types of retail stores (23) and/or various types of suppliers (24). The system calculates projected sales for each product at each facility and calculates projected replenishment shipments between facilities and suppliers a specified number of weeks into the future. The calculated forecasts and replenishments are done in ways that account for the unique needs of retail organizations, and allow efficient processing and storage of the large data volumes typical in many retail organizations.

55 Claims, 25 Drawing Sheets

METHOD AND SYSTEM FOR DETERMINING TIME-PHASED PRODUCT SALES FORECASTS AND PROJECTED REPLENISHMENT SHIPMENTS FOR A RETAIL STORES SUPPLY CHAIN

This application claims the benefit of Provisional application Ser. No. 60/126,454, filed Mar. 26, 1999.

FIELD OF THE INVENTION

The invention relates to a computer-implemented method and system for simulating the business of retail organizations for the purposes of better managing inventories and finances at both retail organizations and/or suppliers. More particularly, the invention is a method and system for forecasting product sales in a retail store supply chain and determining replenishment shipments to various entities in the supply chain.

BACKGROUND OF THE INVENTION

The typical retail organization uses a reorder point system to manage inventories at the store-level. These are execution systems rather than planning systems. They review products and if the on-hand balance is below a preset number (the reorder point), an order is created to replenish inventory. If the on-hand balance is above the reorder point, no further action is taken. No projections are made into the future for the purposes of planning product requirements from the suppliers or manufacturers. No projections are made for the purposes of planning projected inventory levels. These are strictly inventory management systems designed to release orders at the appropriate time.

Manufacturing companies have used time-phased planning systems (also called DRP or Distribution Resource Planning or Distribution Requirements Planning) beginning with implementations in 1975. These systems provide projections into the future which can be used to plan product requirements, transportation requirements, capacity requirements and financial requirements. However, these systems are designed to meet the needs of a manufacturing organization, and have not proved suitable for a retailer's needs. These systems are not able to process the large data volumes typical of most retail organizations. Additionally, manufacturing systems are not designed to deal with fundamental retailing needs such as promotional replenishments, holiday forecasting, shelf configurations, fast easy-to-use displays of information appropriate for large volumes of data, and product groupings where several products are treated as one for the purposes of forecasting and replenishment.

A typical manufacturing organization of the type that would supply retail stores might stock several hundred to a thousand products at one to ten different suppliers. This results in ten thousand stock keeping locations. A typical retailer might stock ten thousand to fifty thousand products in one to several thousand locations. This results in as many as 100 million stock keeping locations. Systems designed for tens of thousands of stock keeping locations could theoretically be made to work for a hundred million stock keeping locations, but as a result of limitations in computing resources and time available to complete the computing operations this has not been achieved in actual practice. There are numerous technical hurdles to overcome in order to process the amount of data for a retail store supply chain during the relatively short time window in which the processing needs to be done. Most retailers get their sales history (or point of sale data or POS) late in the evening or in the early hours of the morning. Several hours later, the replenishment planning must be complete in order to load trucks for deliveries. Additionally, using systems not designed to economically process this amount of data would force the retailer to purchase significantly more computer processing power than would be needed with a system designed for these volumes (assuming such a system existed).

The current and projected retail store shelf arrangements can have a significant effect on the planned replenishment shipments. For example, an increase in shelf space for Christmas products would cause an increase in projected replenishment shipments some number of days before the planned change in shelf arrangement. Similarly, a return to the normal display after the Christmas season would cause a decrease in the projected replenishment shipments some number of days before the planned return to the normal shelf arrangement. Unfortunately, current time-phased planning systems do not provide capabilities for handling changes in shelf arrangements and showing their resultant impact on the replenishment schedules. Consequently, any planned replenishment shipments calculated without accounting for these shelf changes would be inaccurate, and therefore could not be used to plan product needs at suppliers or suppliers, or to show accurate financial projections of inventory levels at the stores and the suppliers.

This is not a problem which manufacturing companies experience. For this reason, current time-phased planning systems do not provide capabilities for dealing with changes in shelf configurations in a retail store.

Retail stores typically sell a small number of products in two or more different packaging configurations, but do all their forecasting and replenishment in terms of one packaging configuration. For example, the sale of cigarettes happens as packs and cartons. Point of sale (POS) information is collected for both packs and cartons. Yet, all forecasting and replenishment planning is done in cartons. It is not efficient for retailers to forecast the sales of packs, and also forecast the sales of cartons. Nor is it efficient to plan the replenishment of packs and also the replenishment of cartons, and then add the two numbers together (accounting for the number of packs per carton).

This is not a problem which manufacturing companies experience. For this reason, current time-phased planning systems do not provide capabilities for handling products sold in several different configurations, but purchased in only one of these a configurations.

Retail stores do a significant amount of business around holidays. However, these holidays may not fall in the same week every year. For example, in one year Easter may fall in the 13th week of the year, but in the prior year it fell in the 14th week of the year. The systems in use today use sales history to predict future demand patterns. Consequently, because Easter fell in the 14th week last year, these systems will tend to forecast a sales spike in week 14, not week 13 where Easter will fall this year. Unfortunately, this leaves the store with too little inventory during the week of Easter, and too much inventory the week after. Some systems use multiple years of history to predict future demand patterns. In such a system, if Easter fell in the 14th week last year, and the 15th week the year before, these systems will tend to forecast a flattened sales increase, with half the increase in one week and the other half of the increase in another. This represents an inaccurate forecast since the sales increase will all happen in a single week, and the week will be week 13.

This is not a problem which manufacturing companies experience. They build inventory in anticipation of the holidays, and so it doesn't matter if their forecasting systems spread the peak over one or several weeks. For this reason, current time-phased planning systems do not provide capabilities for correctly representing holiday sales at a retail store.

Many retail stores do a significant amount of business through promotions. In some retailers, promotions account for the majority of sales for many products. However, current time-phased planning systems do not contain the specialized logic needed to plan replenishments for promotions. Each promotion needs a special replenishment order, typically referred to as an initial distribution, to deliver enough product to the store to construct an attractive product display. Additionally, this product must arrive in enough time to allow store employees to set up the display, and also give them time to get an emergency shipment if something were to go wrong and their initial distribution were delayed or otherwise not shipped. For example, a store may insist that the initial distribution shipment arrive four days before the promotion is to begin. This provides time to set up the display, and if the shipment has not arrived by three days before the promotion, there is still time to get another shipment before the promotion begins. Retailers are in a difficult position if a promotion begins and they do not have the quantity of product to support the promotion, and so they need this sort of back-up plan.

This is not a problem which manufacturing companies experience. For this reason, current time-phased planning systems do not provide capabilities for initial distribution shipments.

During the promotion, different replenishment approaches should be used as compared to the non-promoted periods. For example, the concepts of safety stock and safety time have been part of the prior art for some time. Safety stock means having a shipment arrive at the store when the inventory is projected to drop to a specific number of units, 10 for example. Safety time means having a shipment arrive at the store or suppliers a specified number of days before it is needed, 2 days for example. The goal in both cases is to prevent the store or suppliers from going out of stock when there are demands which are greater than the forecast. Safety stock levels are better suited to the normal non-promotional demands at a store because the safety stock is based on the number of products needed to provide an attractive display. Safety time is a better way to deal with demands that vary greatly (such as promotions), since it has the effect of adjusting the safety stock level automatically. The current replenishment systems available to retailers typically allow safety stock and/or safety time. However they do not allow safety stock to be used simultaneously for one type of demand (non-promotional demands for example) and safety time to be used for other types of demands (promotional demands for example on the same product). This forces retailers to use an approach that is not well suited to their business, or to create other systems to compensate for the limitations in the existing systems.

An old rule in forecasting is that early sales results are worth all the statistics in the world. This is the basis of test marketing. Similarly, in the early days of a promotion, the marketplace speaks. Unfortunately, the current forecasting and replenishment systems do not use this early sales history to re-project the promotional forecast, and then re-project the planned replenishments during the promotion period. As a result, this early marketplace information is not used to its full potential to ship the right quantities of product to the correct stores, resulting in overstocks at some stores, and out of stocks at other stores.

DRP and MRP systems are widely used by businesses of varying size in local area network (LAN) environments, and to a lesser extent in browser-based intranet environments. Also, it is known for retail stores to order goods from their suppliers over the Internet using browser-based communication systems. However, browser-based DRP systems designed for use in a LAN, on the Internet or in other networks do not provide the speed and functionality required in a retail store supply chain. Furthermore, a need exists among small retail stores for a browser-based time-phased forecasting and replenishment planning system in which such functions are done for such stores by a third party service provider.

SUMMARY OF THE INVENTION

One aspect of the invention is a computer-implemented system for determining time-phased product sales forecasts and projected replenishment shipments for a retail store supply chain using product sales history records generated by retail stores in the supply chain. The system comprises a forecasting system that determines projected sales of a first plurality of products for a retail store in the supply chain using the product sales history records for said retail store, wherein said first plurality of products is a subset of a second plurality of products that is larger than said first plurality of products and said projected sales are determined in accordance with a first benchmark. The system also includes a replenishment system that determines first projected replenishment shipments of products to said retail store from a first entity in the retail store supply chain using said projected sales determined by said forecasting system, wherein said first projected replenishment shipments are determined in accordance with said first benchmark. The first benchmark comprises determining (i) said projected sales for one year in the future in a first time period and (ii) said first projected replenishment shipments for one year in the future in a second time period, when said first plurality of products is 15,000 in number, said second plurality of products is 50,000 in number, the product sales history records are 715,000 in number, there is a net change for only said first plurality of products, and said projected sales and said first projected replenishment shipments are determined using a computer capable of executing, in either of said first time period and said second time period, no more than an equivalent number of instructions to what can be executed by a computer having two X86 instruction set microprocessors, one gigabit of transient memory and at no more than an average of 60% utilization of said two microprocessors, in either of said first time period and said second time period, wherein said first time period and second time period are each less than 20 minutes.

Another aspect of the invention is a computer-implemented forecasting system for determining time-phased product sales forecasts for a retail store supply chain using product sales data generated by retail stores in the chain and at least one of: as a function of changes in date, relative to preceding years, of a holiday that impacts shopping patterns; by smoothing product demand except during a specified time period proximate a holiday that affects shopping patterns; and by determining said projected sales within a weekly time period by allocating greater projected sales to certain days of the week, further wherein said forecasting system includes an override for reallocating said greater projected sales to selected days proximate a holiday where increased sales are expected to occur based on proximity of said selected days to the holiday.

Yet another aspect of the present invention is a computer-implemented forecasting system for determining time-phased product sales forecasts for a retail store supply chain using product sales data generated by retail stores in the chain and by grouping selected different products together and treating them as a single product.

Still another aspect of the present invention is a computer-implemented system for determining time-phased product sales forecasts for a retail store supply chain using product sales data generated by retail stores in the chain and at least one of: by determining an initial projected sales amount for a product before a promotion for said product to account for increased demand as a result of said promotion; and by determining said projected sales for a product during a promotional period for said product on a daily basis using daily sales data generated during said promotional period for said product.

Yet another aspect of the present invention is a computer-implemented replenishment system for determining time-phased projected replenishment shipments for a retail store supply chain using projected sales data for retail stores in the chain generated by a forecasting system, wherein the replenishment system (i) determines first projected replenishment shipments of products to retail stores in the supply chain by a first entity in the retail store supply chain using the projected sales determined by the forecasting system and by grouping selected different products together and treating them as a single product and (ii) determines second projected replenishment shipments of products to said first entity by a second entity in the retail store supply chain using said first projected replenishment shipments.

Still another aspect of the present invention is a computer-implemented replenishment system for determining first projected replenishment shipments of products to retail stores in a retail store supply chain by a first entity in the retail store supply chain using projected sales determined by a forecasting system and for determining second projected replenishment shipments of products to said first entity by a second entity in the retail store supply chain using said first projected replenishment shipments, further wherein said first projected replenishment shipments are determined by at least one of: by determining an initial projected sales amount for a product before a promotion for said product to account for increased demand as a result of said promotion; as a function of a safety stock levels for a product outside of promotional periods for such product and as a function of safety time levels for said product during promotional periods for such product; and by determining said first replenishment shipments during said promotional period on a daily basis using said daily projected sales for said promotional period determined by the forecasting system.

DETAILED DESCRIPTION OF THE INVENTION

Figure 1:
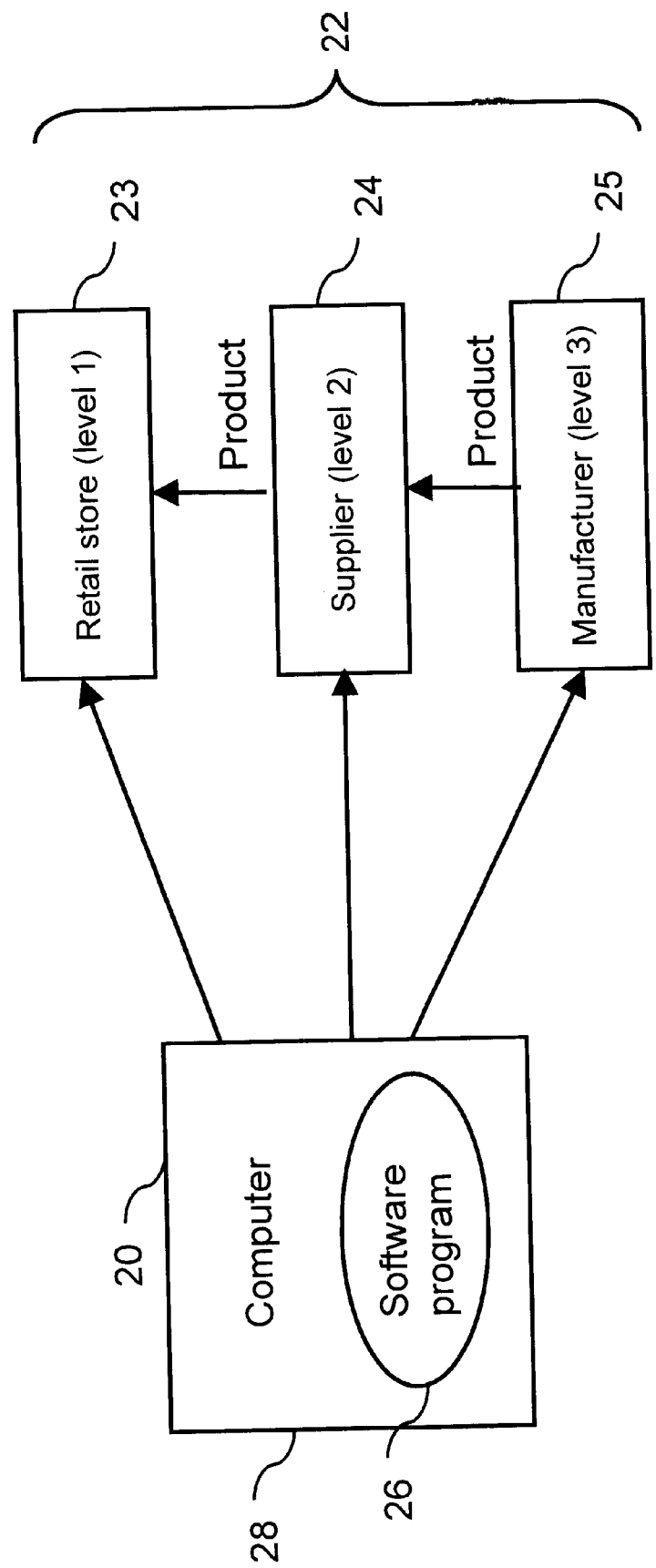
FIG. 1 is a schematic diagram of the system of the present invention and the retail store supply chain with which it is used.
Figure 2:
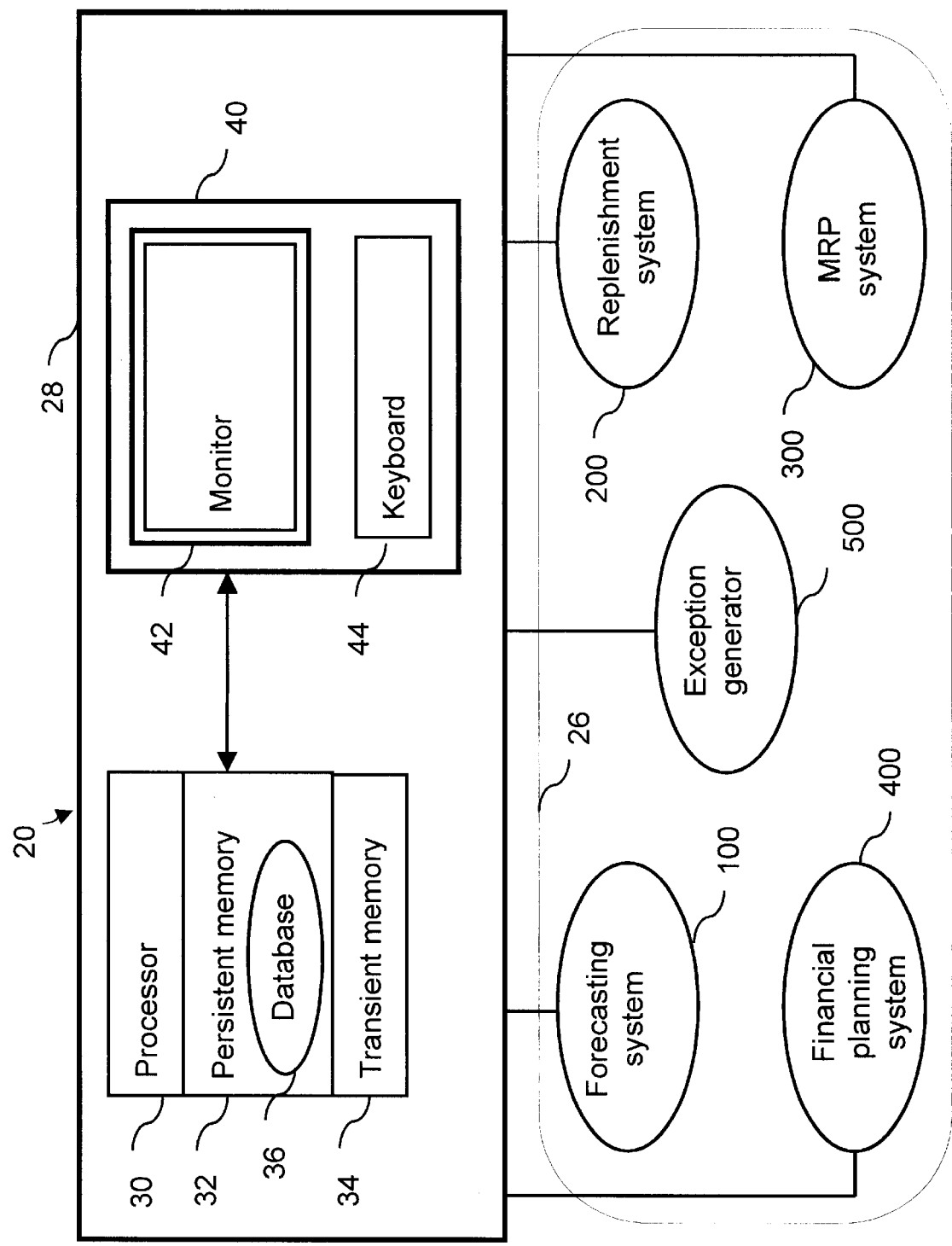
FIG. 2 is a schematic diagram of the system of the present invention.

Referring to FIGS. 1 and 2, the present invention is a time-phased planning system 20 for use in a retail store supply chain 22 having one or more retail stores 23 (the first level in the supply chain), one or more suppliers 24 (the second level in the supply chain) and one or more manufacturers 25 (the third level in the supply chain). Retail store 23 can be a "bricks and mortar" store of any size or type, e.g., a small general store or a large "warehouse" store of a national chain. In addition, retail store 23 may be a so-called "clicks and bricks" store in which products are purchased on-line from a traditional store. Further, retail store 23 may be a pure e-commerce organization. Supplier 24 could be any one of the following facilities: a retail supplier, a satellite supplier, a retail depot, a wholesaler, an independent distributor, a manufacturer's supplier, or a manufacturer's plant. Manufacturer 25 could be any one of the following facilities: a manufacturer's distribution center, a wholesaler, an independent distributor, a manufacturer's supplier, or a manufacturer's plant. For purposes of illustration, this third level in the supply chain will be generally referred to as manufacturer 25, recognizing that this level could be any of a number of different types of facilities, depending on the supply chain for a particular product. For example, a weight set might be stocked at retail store 23, and the store supplied by supplier 24 that is a retail distribution center (level 2) and the retail distribution center supplied by a manufacturer 25 that is a manufacturing plant (level 3). In another situation, this weight set might be supplied to retail store 23 by a supplier 24 that is a retail cross-dock distribution center (level 2) and the retail cross-dock distribution center is supplied by a manufacturer 25 that is a manufacturer's distribution center (level 3), and the manufacturer's distribution center is supplied by a manufacturing plant (level 4, not shown on the diagram). In a third situation, the weight set at retail store 23 might be supplied by supplier 24 that is an independent distributor (level 2), and the independent distributor is supplied by a manufacturer 25 that is a manufacturing plant (level 3). There are any number of other permutations of this supply chain, each of which may be appropriate to the distribution of a particular product to a retail store or stores. The important element is not the specific structure of the supply chain for a particular product at a particular store, or the number of levels in the supply chain, but rather the fact that multiple customer-supplier relationships exist in the supply chain, and these can be integrated into a single planning and replenishment network. The levels in this network can have the same or different systems 20, yet the network functions as a whole. This is analogous to the Internet where different types, models, and manufacturer's computers are integrated into a network. Where the common language of the Internet is the TCP/IP protocol, the common language of the supply chain network is the schedule of projected replenishments between any two nodes in the supply chain (e.g., a retail store 23 and a supplier 24).

System 20 may be implemented as a software program 26 that is executed using one or more computers 28. As described in more detail below, software program 26 used in system 20 includes a forecasting system 100, a replenishment system 200, an MRP system 300, a financial planning system 400 and an exception generator 500. Computer 28 includes processor 30, persistent memory 32, transient memory 34, a database 36 of product and other information is stored in persistent memory 32, and a user interface 40. Persistent memory 32 has a relatively high capacity, and a relatively slow access time, and includes memory such as magnetic or optical disk drives. Transient memory 34 has a relatively low capacity, and a relatively fast access time, and includes memory such as random access memory (RAM) semiconductor devices. Various elements may be included in user interface 40, including a monitor 42 and a keyboard 44.

Figure 3:
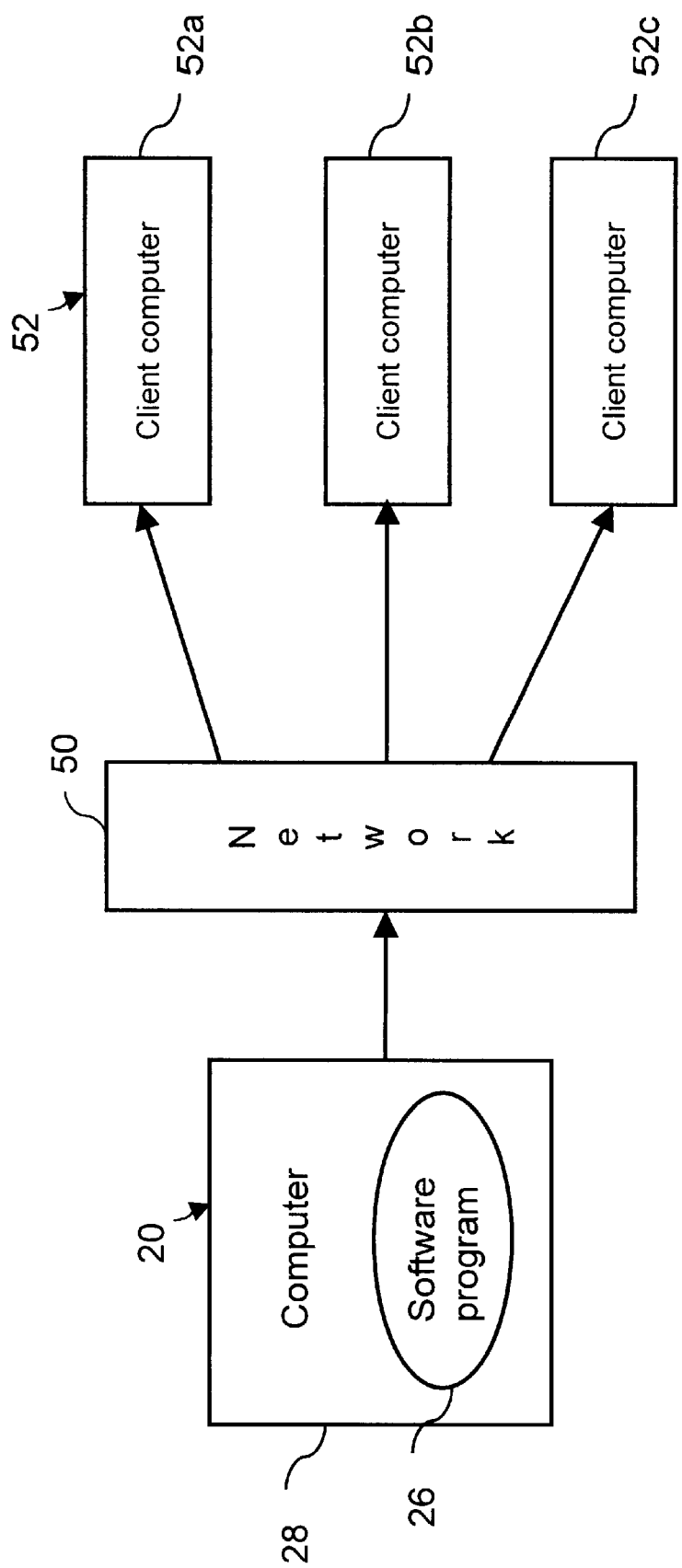
FIG. 3 is a schematic diagram of one implementation of the system.
Figure 4:
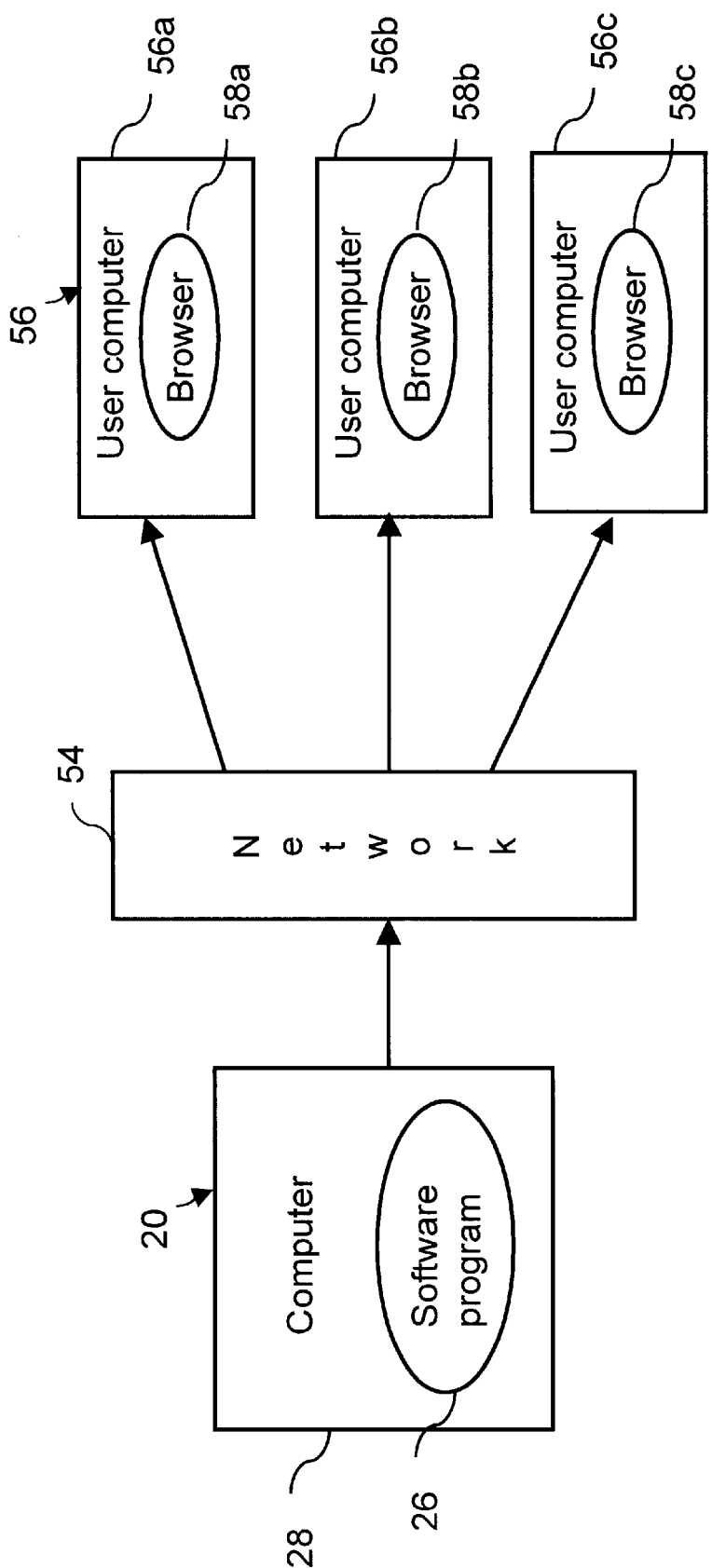
FIG. 4 is a schematic diagram of another implementation of the system.

Turning next to FIGS. 3 and 4, system 20 may be implemented in several ways. In some cases, system 20 may be implemented as a standalone system where computer 28 does not deliver the results of its planning system computations to other computers but displays the results to a user. Alternatively, as illustrated in FIG. 3, it is desirable in some situations to implement system 20 in a client-server networked computer system. With this implementation, computer 28 is a server and is connected via network 50 to multiple client computers 52, e.g., client computers 52a, 52b and 52c. In yet another implementation of system 20, illustrated in FIG. 4, computer 28 is connected via the network 54 to multiple user computers 56, e.g., user computers 56a, 56b and 56c, each of which has a browser 58 for providing navigation capabilities within network 54. The latter would comprise the Internet, an intranet, an extranet, electronic data interchange ("EDI") networks or other networks. User computers 56 may include without limitation PCs, various "thin client" or "Internet appliance" devices such as pagers, cell phones, digital assistants, and other devices permitting connection to and navigation within the network 54.

Figure 5:
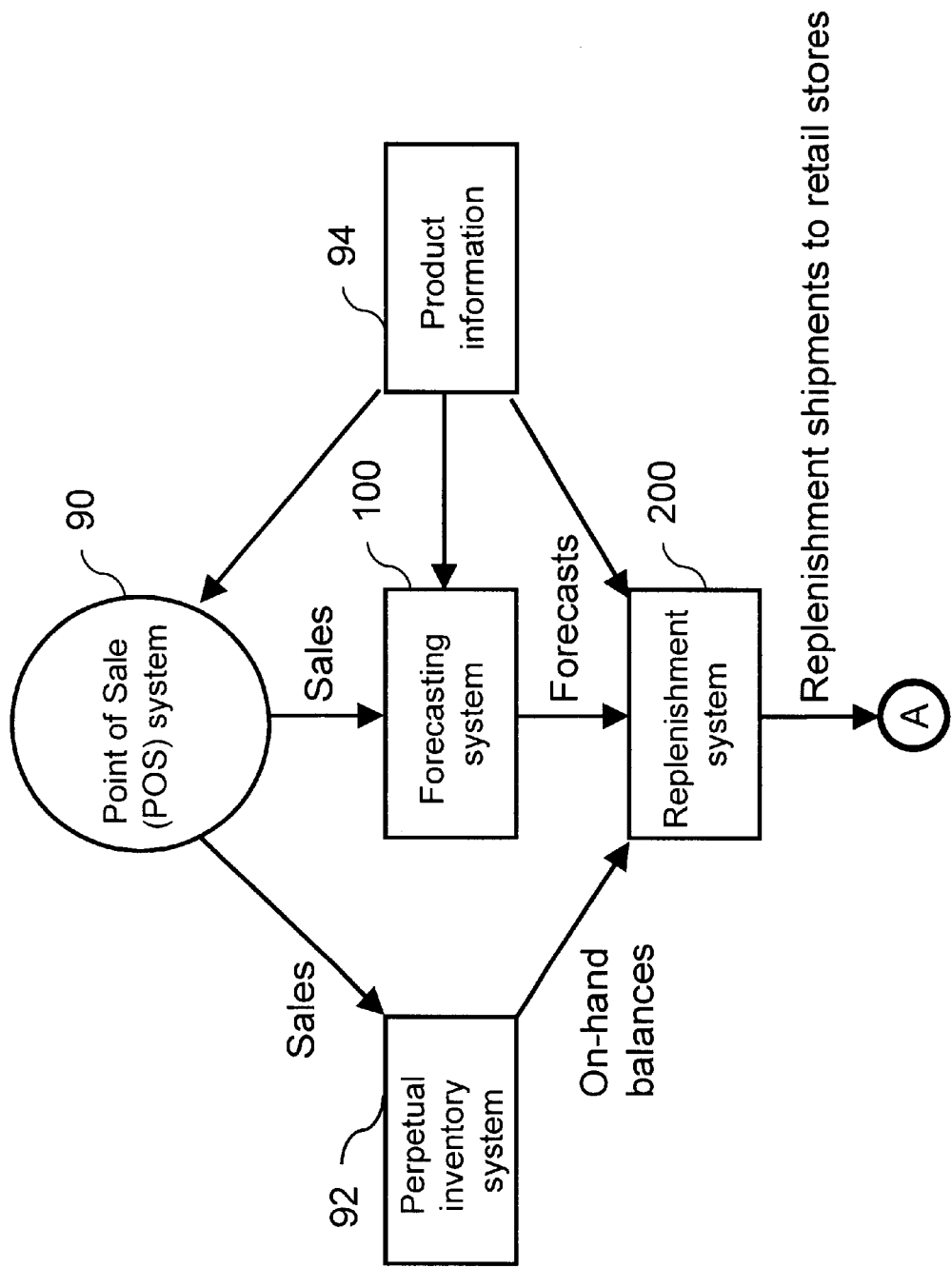
FIG. 5 is a schematic diagram illustration the interrelationship of elements of the system and inputs to the system at the retail level, i.e., at the top level in the supply chain.

Describing the invention in somewhat greater detail, FIG. 5 illustrates how system 20 operates at the level of retail store 23 (FIG. 1). A conventional point of sale (POS) system 90 provides sales information in the form of products sold, quantities sold, and date sold. A suitable POS system 90 is sold by Cornerstone Systems of Austin, Tex., and is identified as BEETLE, although nearly any POS system would also work. This POS information is used for two purposes. The first purpose is to provide a sales history for use in creating a statistical forecast of projected sales for each product at each location. The second is to update the perpetual inventory in perpetual inventory system 92, which permits reduction in the on-hand balance maintained for each product at each location. Product information 94 from a database (not shown) for retail store 23 is also used in calculating the sales forecasts. Product information 94 includes product descriptions, on-hand product inventory and parameters used in forecasting and replenishment such as typical shipping quantities, time periods to use in forecasting, and so on.

Forecasts from forecasting system 100 are used as inputs to replenishment system 200. Forecasts represent projected sales. Planned replenishments represent projected shipments to retail store 23, which will be received into inventory. The differences between what is projected to be sold and what is projected to be shipped include: the amount of inventory already on hand at retail store 23, the case size (or economical shipping size), the dates when deliveries can be made to the store, the lead time (or transit time) from supplier 24 to the retail store 23, the number of days or weeks of supply that should be delivered at one time to prevent an excessive number of small deliveries, and projected changes to the arrangement of products on the store shelf. As with forecasting system 100, product information 94 from a database for retail store 23 is typically used in the replenishment planning process.

Projected replenishment shipments to retail store 23 are then passed to the store's supplier 24 at the second level of the supply chain. This is shown in FIG. 5 by the connector marked A. Based on the projected replenishment shipments, supplier 24 provides replenishment shipments to retail store 23.

Figure 6:
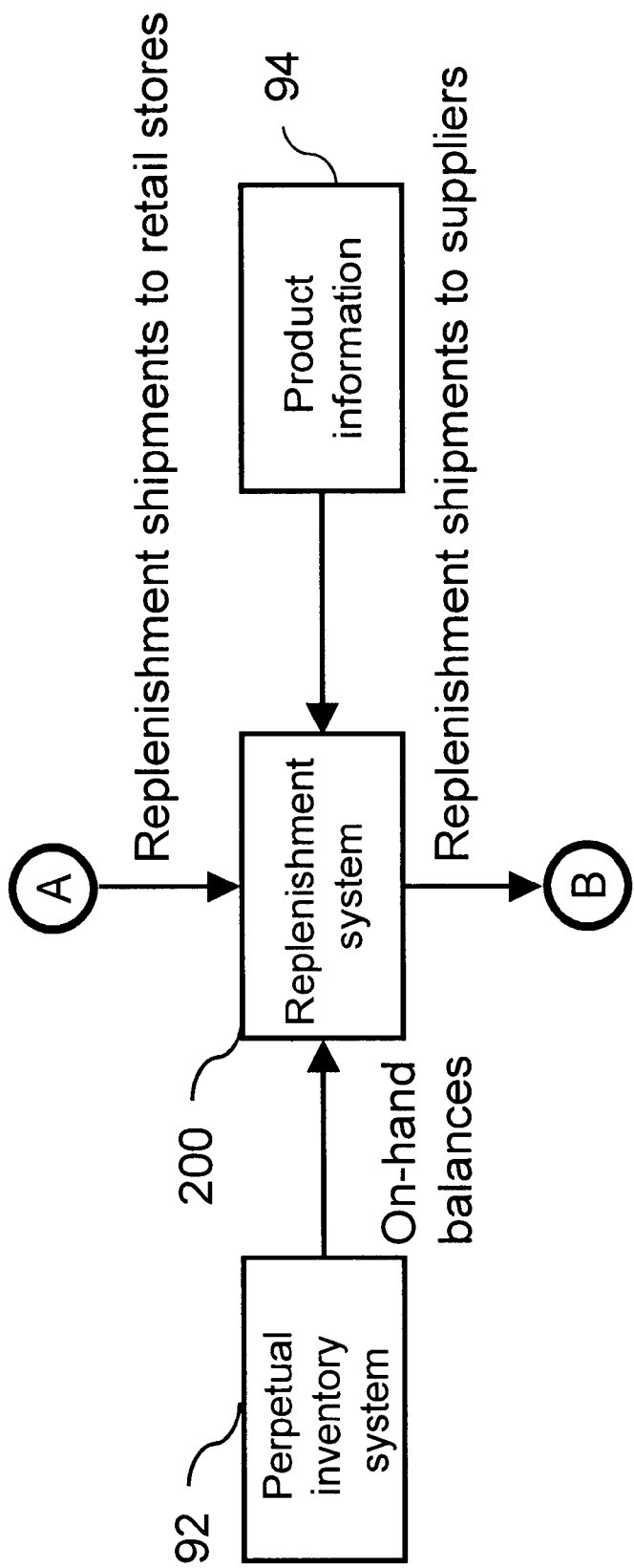
FIG. 6 is a schematic diagram illustrating the interrelationship of elements of the system and inputs to the system at the supplier level, i.e., at the second level in the supply chain.

FIG. 6 illustrates how system 20 operates at the level of supplier 24, i.e., at the second level of supply chain. In this case, there is typically no statistical forecasting system. Instead, the projected replenishment shipments from the replenishment system 200 for retail stores 23 are summarized and used in place of a statistical forecast. The sum of these projected shipments provides a more accurate projection of demand on suppliers 24 than a statistical forecast based on historical shipments. In some situations, it may be desirable to use a small statistical forecast at this second level of the supply chain. For example, a supplier 24 that is a retail distribution center can supply a number of retail stores 23, and in addition service customer orders for products not normally stocked at some stores, or service telephone or Internet customer orders for products to be shipped directly to customers. In any of these situations, the projected shipments to the stores are added to a statistical forecast representing the customer demand for products ordered from stores where these products are not stocked or the demand from telephone or Internet sales, to give the total demand at the retail distribution center or other supplier 24 at the second level in the supply chain.

The sum of the projected replenishment shipments to retail stores 23 is used as input to replenishment system 200 at suppliers 24. The sum of the projected replenishment shipments to retail stores 23 represents what will be shipped out of suppliers 24. Planned replenishment shipments to suppliers 24, when the second level in the supply chain, represent projected shipments from other suppliers 24 and manufacturers 25 at lower levels in the supply chain. Depending on the product and stores, the second and third levels of the supply chain could be any number of different types of facilities, such as wholesalers, independent distributors, manufacturer's distribution centers, manufacturing plants, and so on. Differences between what will be shipped from the second level in the supply chain (suppliers 24) and what is projected to be shipped into this level include: the amount of inventory already on hand at the suppliers, the case or pallet size (or economical shipping size), the dates when deliveries can be made to the suppliers, the lead time (or transit time) from the supplier to the suppliers, the number of days or weeks of supply that should be delivered at one time to prevent an excessive number of small deliveries, shelf configuration and projected changes to safety stock at the suppliers. As with replenishment system 200 at the level of retail store 23, product information from the organization's database is used in the replenishment planning process for suppliers 24.

Figure 7:
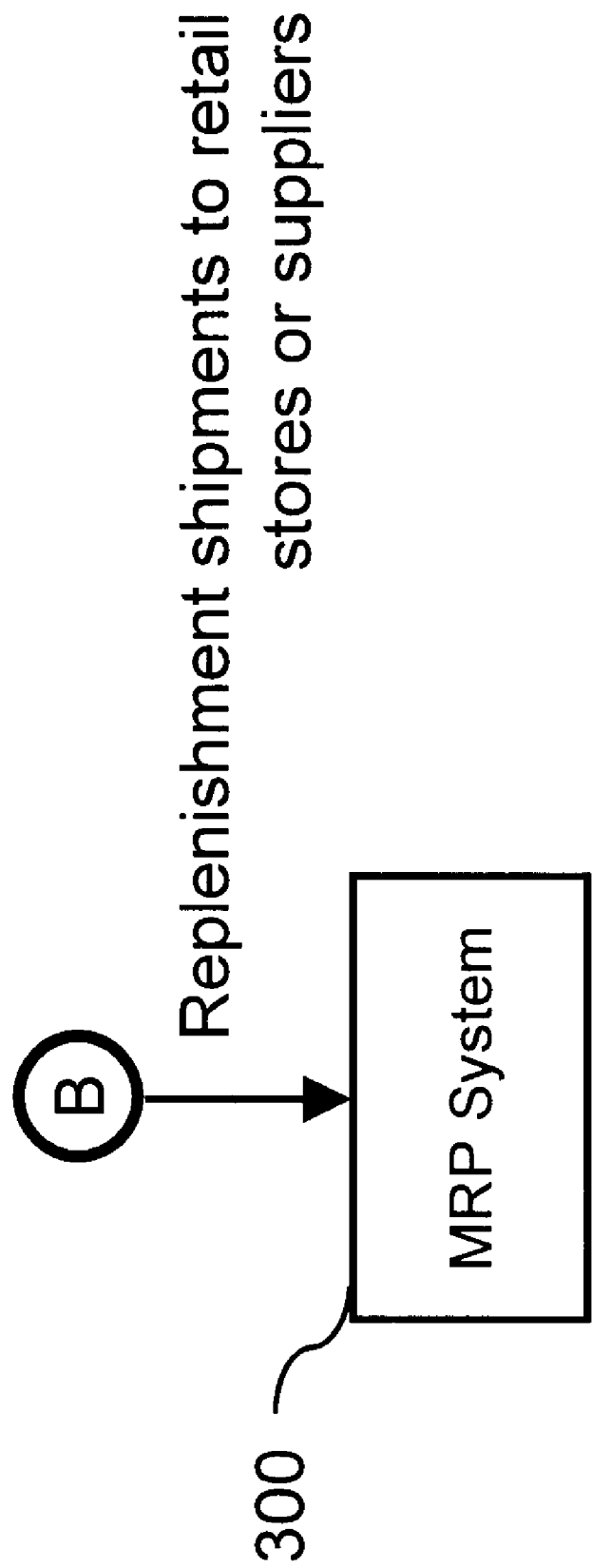
FIG. 7 is a schematic diagram illustrating the MRP system of the system at the manufacturer level, i.e., at the third level in the supply chain.

As mentioned earlier, many supply chains have multiple levels of suppliers, each supplying one another. This is shown by the connector in FIG. 6 marked B. FIG. 7 illustrates system 20 at the level of manufacturer 25, which is the third level of the supply chain. As mentioned earlier, manufacturer 25 could be a wholesaler, independent distributor, manufacturer's distribution center, or manufacturing plant. Assuming the third level is a manufacturing plant, the projected replenishment shipments are input into manufacturing planning system 300. In the situation where the supply chain for a product or set of products is from a manufacturing plant direct to the retail store 23, the systems shown in FIG. 6 would be absent, and the projected shipments represented by connector A would drop down and be identical to connector B on FIG. 6. In effect, the lack of a distribution center-type supplier 24 means this level is absent from the supply chain, and the store-level systems represented in FIG. 5 would connect directly with the manufacturing systems represented in FIG. 7.

Manufacturing planning system 300 used by most manufacturers is a time-phased planning system. Generally, these systems are called MRP, MRP II, Material Requirements Planning, Manufacturing Resource Planning, Enterprise Resource Planning, or ERP systems. Like the DRP systems mentioned above, these MRP systems provide projections into the future which can be used to plan product requirements, capacity, and finances. Manufacturing planning system 300 starts with a forecast of customer demand. Customers using time-phased planning system 20 electronically transmit their projected replenishment shipments to manufacturer 25. The latter can use this information instead of a statistical forecast of customer needs, providing more accurate projections of future shipments to customers. Manufacturer 25 creates a master production schedule based on the anticipated customer needs. This is a schedule of future production. The master production schedule is then broken down into the detailed material and capacity requirements. The bill of material is used to identify what materials go into each product, and the quantities of each that are needed. This information, in addition to the quantities of material that are on hand and on order from suppliers, and the appropriate ordering quantities for different items, are all used to create the detailed time-phased plan for material. The detailed time-phased plan for material is then extended by the routing to give the detailed capacity requirements. A routing is a list of manufacturing steps, showing the number and skill level of labor hours required, the type of machinery required. These capacity requirements are then summarized by labor skill level and equipment and used to make decisions on hiring, subcontracting, acquiring new equipment, and so on. The detailed material and capacity plans in addition to the anticipated customer demands can then be multiplied by the cost and selling price information to provide financial projections which can be used to do cash planning, profit projection, and so on. Manufacturing planning system 300 receives valuable input from system 20 in the form of more accurate projected customer demands.

Forecasting

System 20 is designed to permit extremely large numbers of products to be planned on relatively inexpensive computers. This allows organizations with very large amounts of data, like retailers for example, to be able to use system 20. Two different methods are used to streamline the processing: (1) storing forecasts in weekly, monthly, and longer time periods, and (2) converting these forecasts into daily time periods for a user-specified number of weeks, and then weekly time periods for the remainder of the planning horizon.

Figure 8:
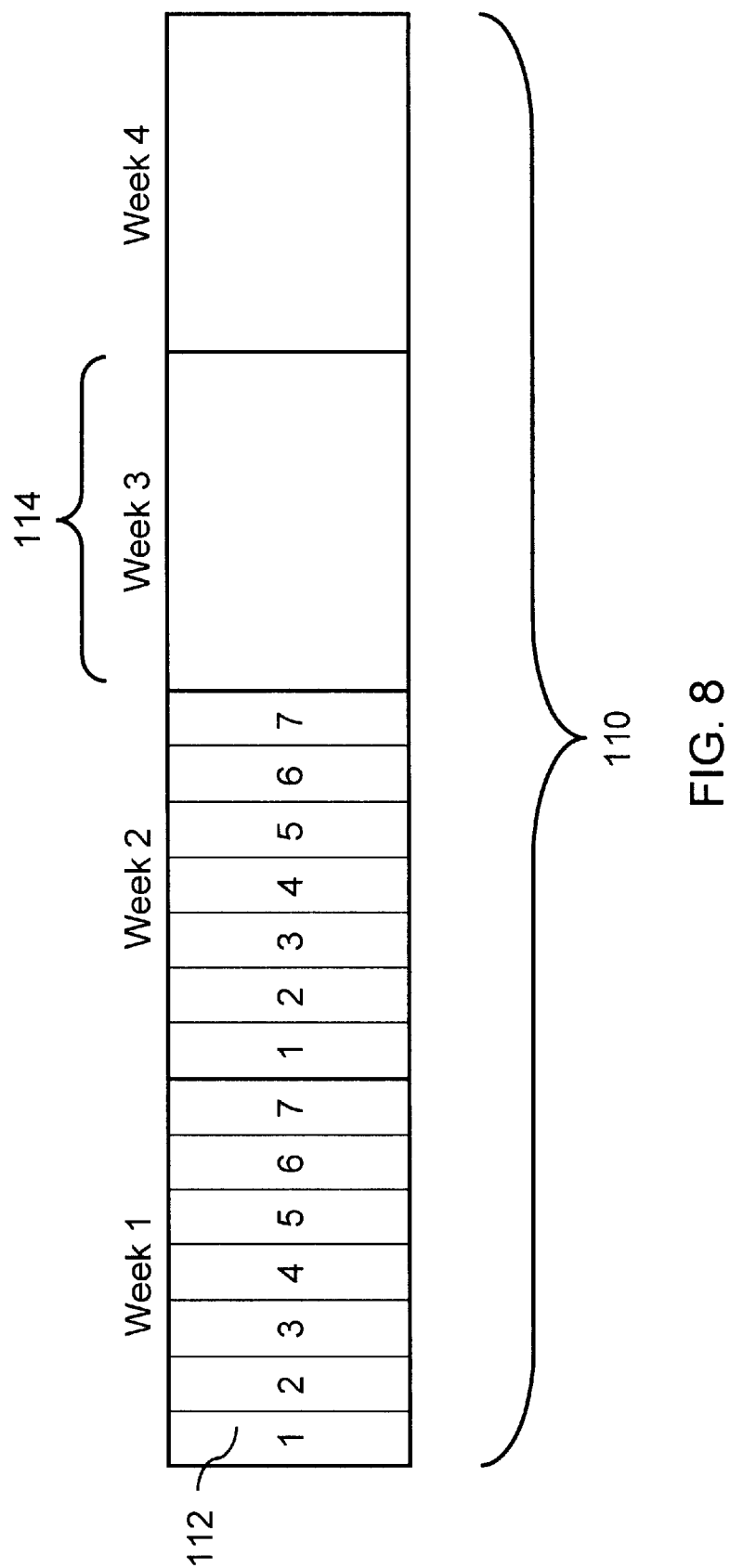
FIG. 8 is a schematic representation of how forecasts are stored in memory with the system.

Referring to FIGS. 2 and 8, it is a fact that many retail stores 23 sell relatively low volumes for many of the products they stock. For example hot sauce may only sell eighteen units per year. It is difficult to say exactly when one of these bottles of hot sauce will sell. However, it is reasonable to forecast that an average of one and a half will sell each month. Given this level of imprecision, there is no reason to store four weekly forecasts in database 36 as compared to one monthly forecast. Reading four weekly forecasts from database 36 is a relatively expensive operation in terms of computer processing as compared to reading one monthly forecast from the database and breaking the monthly forecast into daily and weekly forecasts in memory. FIG. 8 illustrates this processing. A single monthly forecast 110 is read from database 36 which is stored in persistent memory 32. In transient memory 34, forecast 110 is then broken into a user specified number of daily forecasts, say fourteen daily forecasts 112 for weeks 1 and 2 and weekly forecasts 114 for the remaining weeks such as weeks 3 and 4.

Similarly, the replenishment calculations are done using the fourteen daily forecasts 112 and two weekly forecasts 114 for weeks 3 and 4 using average values for the forecast quantity. FIG. 8 illustrates a one-month planning horizon for simplicity. Most retailers would use planning horizons of 3 to 12 months.

Pareto's Rule applies to products in the typical retail store. Eighty percent of the products sell in small volumes and a monthly or less frequent forecast is appropriate. Only twenty percent or less of the products in the typical retail store require weekly forecasts be stored in database 36.

In a typical store with thirty thousand products, weekly forecasts 112 would create a database 36 with 1.56 million forecast rows (or records). By storing the forecasts in weekly, monthly, and longer time periods, the number of forecast records is reduced to 330 thousand forecast rows (or records), or about 20 percent of the number of records that would be required if weekly forecasts were stored.

Figure 9:
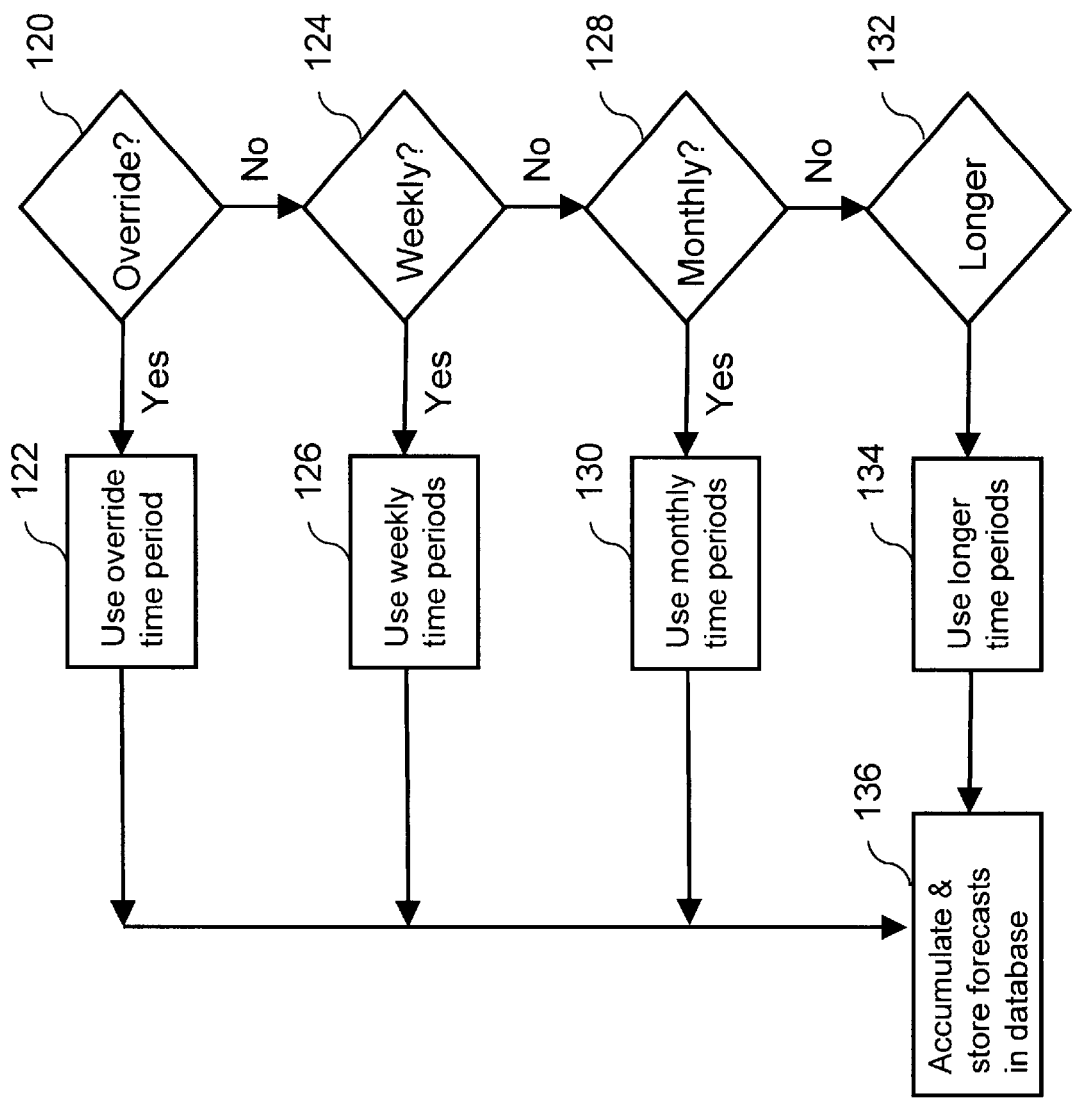
FIG. 9 is a flow diagram illustrating the logic used for determining time periods for forecasting.

Turning next to FIGS. 2, 8 and 9, forecasting system 100 uses various logic to determine the time periods for forecasting. In the flow diagram of FIG. 9, as well as in other flow diagrams in the Figures, it is to be appreciated that the logic or operations represented are implemented in conventional manner using software programming languages, architectures, data flows and other features known to those skilled in the art. Processor 30, together with memory 32 and 34, reexecutes logic or operations implemented by the software by creating reprogrammable logic and other circuits to execute such logic or operations in the software. Discussing how known forecasting periods are determined, if at step 120 it is determined that an override to a normal forecast period is specified, then override time period is used, as indicated by step 122. For example, if a product would normally be forecast using monthly forecasts 100, but a planner or analyst wants to override this logic and force the system to use weekly forecasts 114, this logic will cause forecasting system 100 to forecast in weekly time periods. System 20 permits users to specify an override to the forecasting time period at several levels. For example, users can set a category of products to weekly, monthly, or longer forecasting time periods. Additionally, users can specify a forecasting time period for a certain product at a certain location (retail store 23 or supplier 24).

If an override is not specified, the logic proceeds to step 124 where a determination is made if the projected annual sales forecast for a product at a location exceeds the user-specified threshold for weekly forecasting (100 products, for example). If so, weekly forecasting is used, as indicated by step 126. If not, then the logic proceeds to step 128.

At step 128 a determination is made if the projected annual sales forecast for a product at a location is less than the user-specified threshold for weekly forecasting (a sales rate of 100 products year, for example), and greater than the user-specified threshold for monthly forecasting (a sales rate of 12 products per year, for example). If so, then monthly forecasting is used, as indicated by step 130. If not, then the logic proceeds to step 132.

At step 132 a determination is made if the projected annual sales forecast for a product at a location is less than the user-specified threshold for monthly forecasting (a sales rate of 12 products per year, for example). If so, then a longer time period is used for forecasting, as indicated by step 134. The longer period may be user specified, and could be any length of time, but for purposes of illustration might be one quarter of a year, or one-half a year.

In the case of monthly or longer forecast periods, weekly forecasts are accumulated into months (four or five weeks) or longer periods, and are then stored in the database 36, as indicated by step 136

Holiday Periods

Referring now to FIGS. 2 and 10–12, another feature of the invention is the processing of holiday periods with forecasting system 100. Three types of holiday adjustments may be performed: holiday sales from prior years are shifted, smoothing is eliminated during holiday periods, and daily sales percentages are overridden during holiday weeks.

Figure 10:
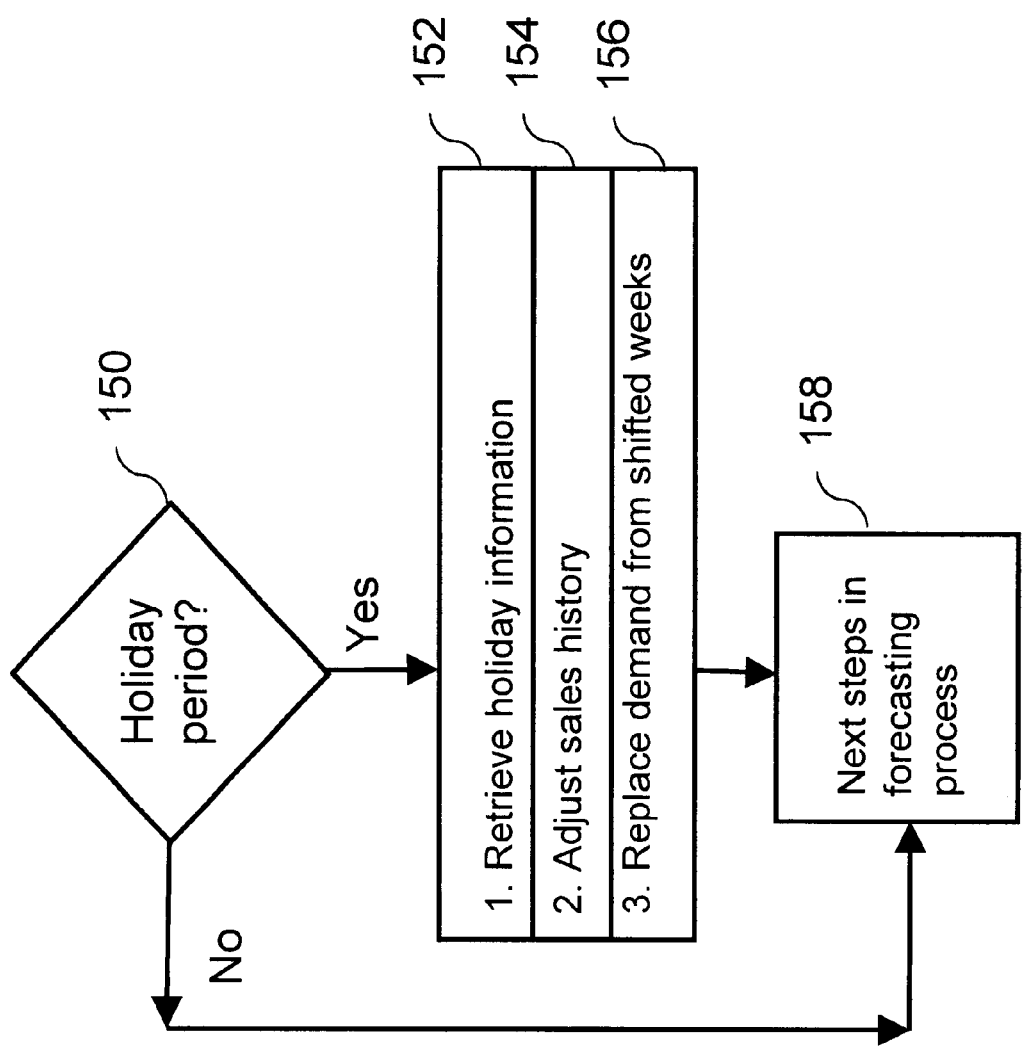
FIG. 10 is a flow diagram illustrating the logic used for shifting holiday sales from previous years.

Forecasting where holidays are taken into consideration begins at step 150 (FIG. 10). There, a determination is made if the time period for which a forecast will be generated includes a holiday. If so, then at step 152 holiday information is retrieved from database 36 (FIG. 2) and loaded into holiday arrays. Next, at step 154 sales history from prior years are shifted into the week in which the holiday falls this year. For example, if this year Easter falls in the 13th week of the year, but last year it fell in the 14th week of the year, forecasting system 100 adjusts the prior years sales spikes into the correct week. As a result, the spike in sales which happened in week 14 of last year is translated into a spike in forecasted sales in week 13 for this year. Without adjusting sales history, forecasting system 100 would create a spike in demand the week after Easter, which would be incorrect. This shifting does not affect the database of sales history, and is done only for the purposes of making the current forecast.

Then, at step 156, sales history numbers that were shifted are replaced with other numbers. For example, once week 14 of last year has been moved to week 13 of this year for the purposes of forecasting, week 14 of last year needs to be filled with a replacement sales number. This is done using an averaging calculation which is calculated differently depending on whether the product is highly seasonal (such as Christmas lights) or whether the product is high or low volume. For products that are not highly seasonal and exceed a user-specified annual forecast representing relatively high volume, an averaging calculation using the surrounding non-promotional weeks gives the best results. For highly seasonal products or products with low volumes, averaging the surrounding weeks leads to errors. In the case of highly seasonal products, the selling season can be short and sales volumes can vary significantly from week to week. Therefore, averaging the surrounding weeks gives a misleading estimate of sales for the week. In the case of low volume products, a sale may have occurred in the week before or after the week being replaced. These sales are relatively rare events, and should not be seen as indicative of every week. In both of these situations, a seasonal profile is used to calculate the replacement sales numbers. After step 156, or if at step 150 it is determined no holidays exist in the forecast period under consideration, then forecasting proceeds with the next steps in the forecasting process, as represented by step 158. These steps include smoothing or averaging the forecast, adjusting the forecasting information for promotions, adjusting the forecasting information for abnormal demands (such as hurricanes, ice storms, and so on), calculating the trend, projecting the future sales, and so on.

Forecasting system 100 then smooths the forecasting curve using conventional algorithms not forming part of the present invention. For example, the fact that 20 products sold in week 15 of last year and 10 sold in week 16 of last year does not mean that pattern will repeat again this year. In many situations, the best estimate is that 15 products a week will be sold during this time of year. However, the sales forecast of 15 products a week is an average and actual sales may be above this number some weeks and below this number in other weeks. This averaging of demand is valuable during non-holiday periods. However, during holidays, the spikes in demand are meaningful, and smoothing of sales curves is not an accurate projection of the future sales. An important feature of forecasting system 100 is that it does not perform smoothing of sales for a user-specified number of weeks around each holiday.

Figure 11:
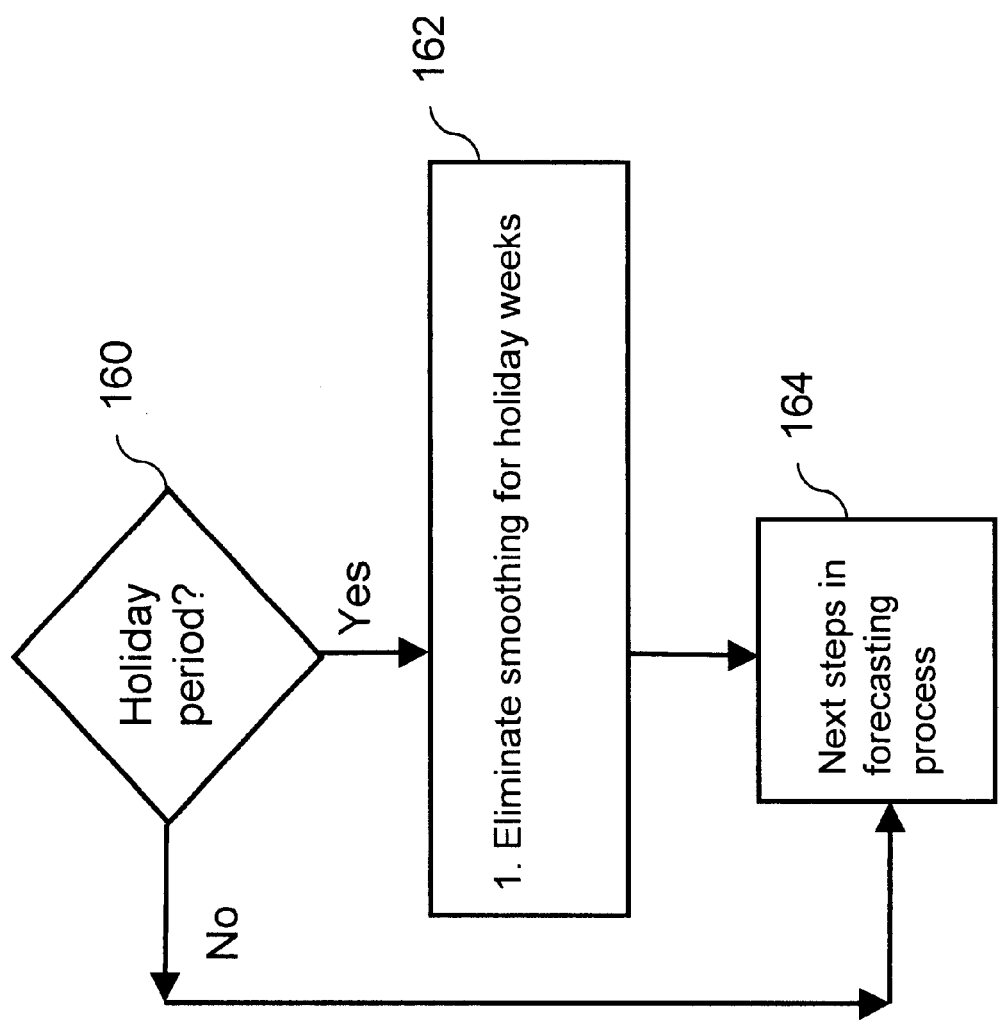
FIG. 11 is a flow diagram illustrating the logic used for eliminating smoothing during holiday periods.

Referring to FIG. 11, if at step 160 a determination is made that a holiday falls in the time period for which a forecast is requested, then the forecasting system eliminates smoothing, as depicted at step 162. For example, if the demand for a particular product outside the holiday period is fifteen products per week, but the demand during the holiday week is fifty products per week, then forecasting system 100 will not average the fifteen products and the fifty products, but rather show a forecast of fifteen products per week during the weeks outside the holiday period, and forecast sales of fifty products per week for the holiday week.

Thereafter, or if no holidays are determined to exist at step 160, then forecasting system 100 proceeds to the next steps in the forecasting process, as depicted by step 164 and described above relative to. step 158.

Figure 12:
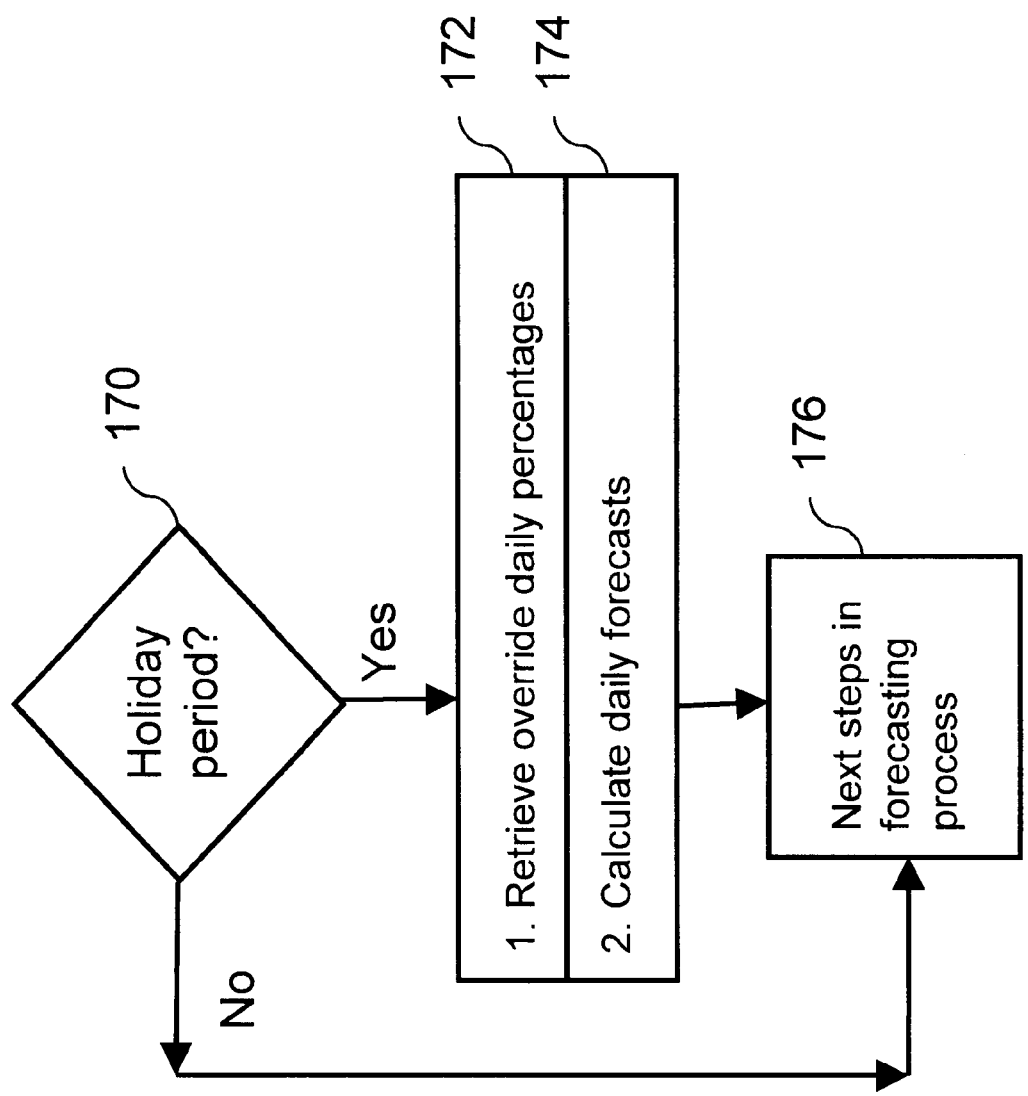
FIG. 12 is a flow diagram illustrating the logic used for overriding daily sales percentages during holiday periods.

Referring now to FIG. 12, each retail store 23 typically has a sales pattern that varies by day of week. In most stores, for example, the weekends have the greatest traffic, and therefore a greater percentage of the weekly forecast should be allocated to the weekend days than to the days in the middle of the week. However, during holiday weeks this may not be the case. For example, a grocery retailer will see a larger percentage of sales during the days just prior to Thanksgiving than would be the case in a non-holiday week. On the other hand a toy retailer will see a larger percentage of sales during the days just after Thanksgiving than would be the case in a non-holiday week. Forecasting system 100 is designed to address these factors. After determining at step 170 that a holiday exists in the period for which a forecast is to be generated, then forecasting system 100 proceeds to step 172. There, the override percentages are retrieved from database 36 and loaded to daily override arrays. Then, at step 174, daily forecasts are retrieved by multiplying the weekly forecasts by the override percentages rather than the normal daily percentages. Once the daily forecasts have been calculated to correctly show the days where the sales are likely to take place, the remainder of the forecasting process can proceed as for non-holiday periods, as identified by step 176 and described above relative to step 158.

Replenishment Planning

Referring next to FIGS. 2 and 13, system 20 provides projected replenishment shipments using replenishment forecasts using replenishment system 200. The latter performs replenishment plans in daily time periods for a user-specified number of weeks, and then converts to weekly time periods for the remainder of the planning horizon.

In the near term, it is essential to do replenishment planning in days. Suppliers 24 need to know what products must be shipped today, tomorrow, and so on. It is not good enough to say what has to be shipped this week and not specify when during the week the products should be shipped.

However, in the longer term, it is not important to schedule in terms of days. Weekly scheduling is adequate. For example, suppliers 24 do not need to know what day a product will be shipped twenty weeks from today. That far into the future, planning in weekly and monthly time periods is sufficient.

Assuming for example, that two thousand computer instructions need to be executed for each time period which is planned, a company planning fifty-two weeks into the future in daily time periods would have to execute 728 thousand computer instructions for each product. If this same company were to plan four weeks into the future in daily time periods and remaining forty-eight weeks in weekly time periods. only 152 thousand computer instructions would have to be executed, or about twenty percent of the instructions needed to plan entirely in days.

Figure 13A:
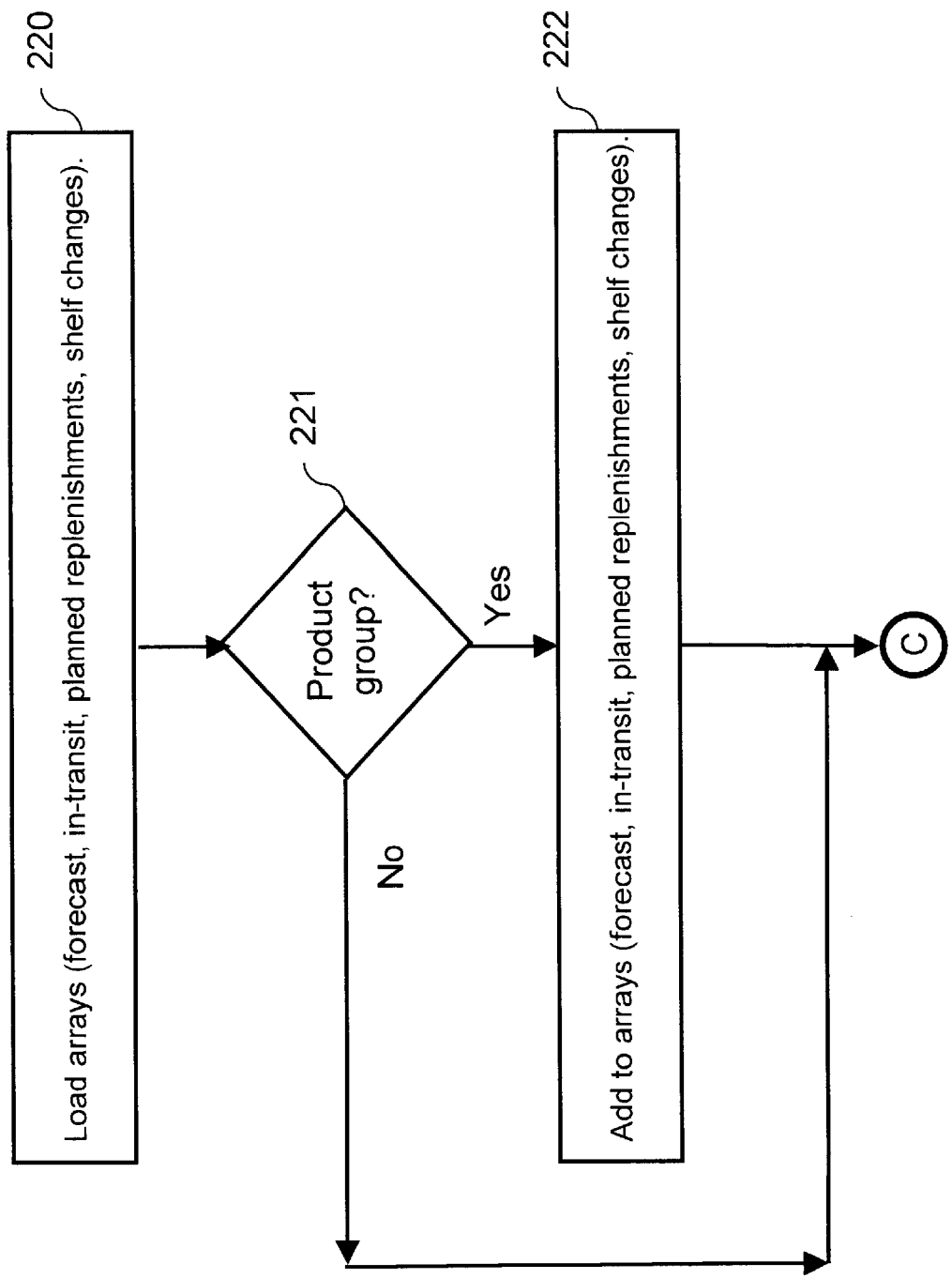
FIGS. 13a–13c are sequential flow diagrams illustrating the overall logic used for replenishment planning.
Figure 13B:
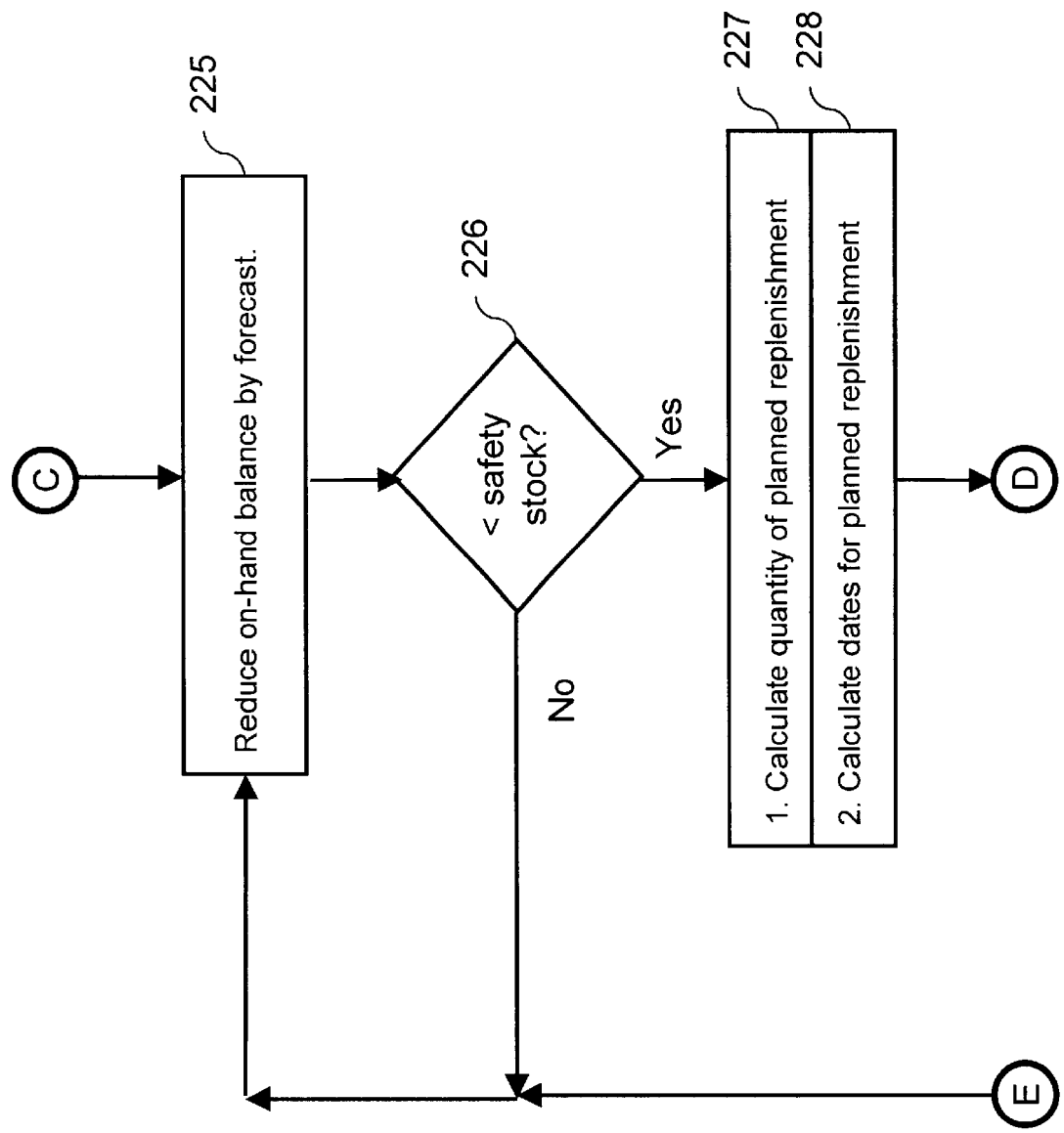
Figure 13C:
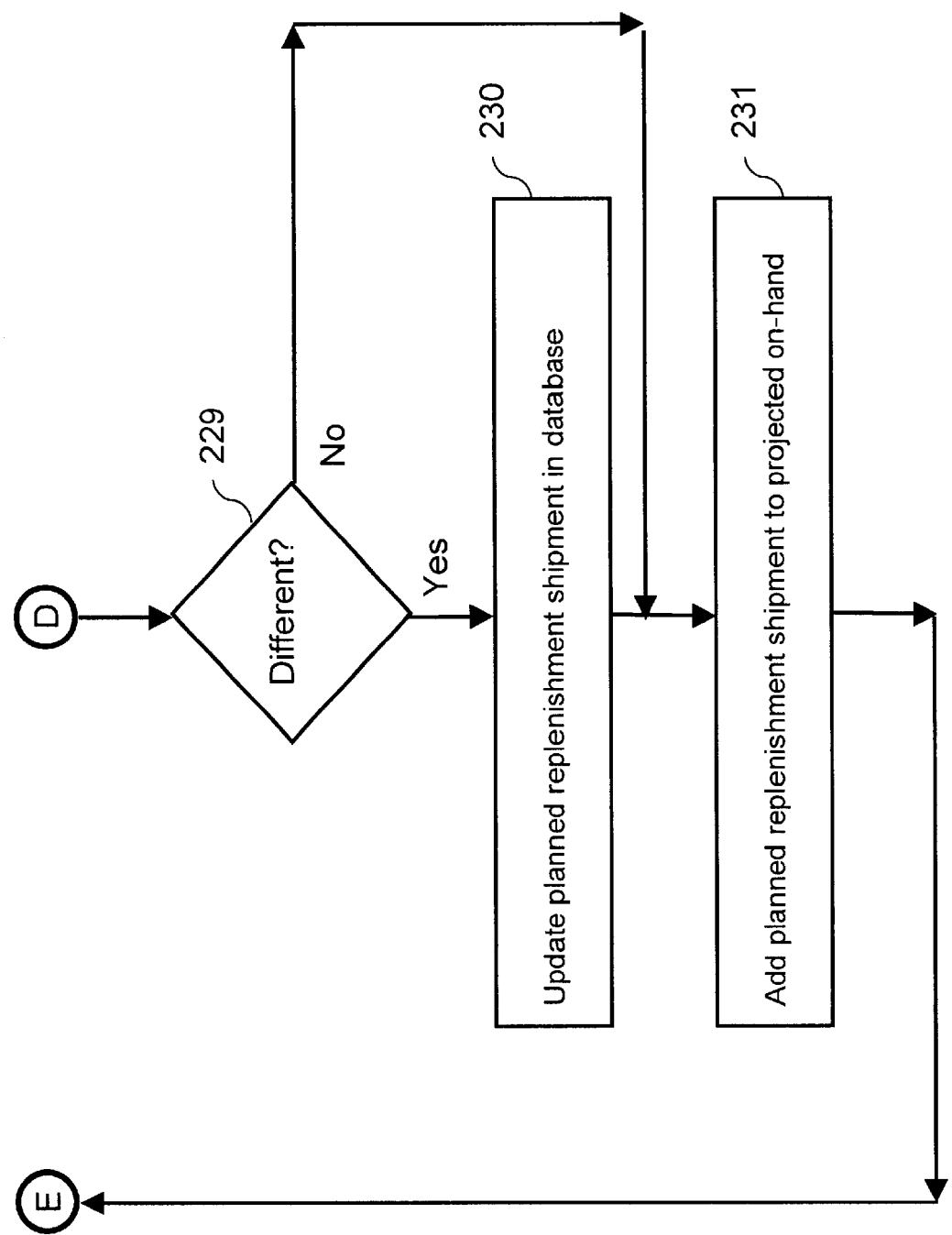

The logic for accomplishing replenishment planning is illustrated in FIGS. 13a–13c. The process begins at step 220 by reading a series of rows from the database 36 and then loading the rows into arrays in transient memory 34. These arrays include forecast, in-transit, planned replenishment and shelf change information for a product with respect to which projected replenishment shipments are to be generated. Next, at step 221 a determination is made if the product has other products in its group (packs and cartons of cigarettes for example). If so, then at step 222 these products are added to the arrays.

Next, at step 225, the process commonly referred to as netting is performed. This is accomplished by reducing the beginning on-hand balance by the forecast quantity. Then at step 226, a determination is made if the resulting projected on-hand balance is less than the safety stock. If not, this process is repeated. If at step 226 the projected on-hand balance is determined to be less than the safety stock, then a planned replenishment shipment is calculated at step 227. There, the quantity of the planned shipment is calculated based on the preferred shipping quantity, desired number of days of supply, dates when the store can receive deliveries, and other ordering parameters. The planned shipment dates (ship date and receipt) are then calculated in step 228. Next, the newly calculated planned replenishment shipment is compared to the existing planned shipment from database 36 in step 229. If they are not the same, database 36 is updated in step 230. Finally, or if at step 229 no difference is determined to exist, the planned replenishment shipment is added to the projected on-hand balance in step 231 and the process continues.

Safety Stock

Another feature of replenishment system 200 is the calculation of time-phased safety stock levels based on the current and future arrangement of products on the shelves of retail stores 23. As explained above, planned replenishment orders which are calculated without accounting for the future changes in shelf configuration will be inaccurate. Consequently, they have limited use in planning for products at suppliers 24 (the second level in the supply chain, a retail distribution center for example), and planning projected inventory levels at retail stores 23 and suppliers 24.

The current and future shelf configurations are stored in database 36. This is done in such a way that shelf-planning systems (or planograms) can be easily interfaced with other aspects of system 20, e.g., replenishment system 200. Database 36 preferably stores the following shelf configuration information: the number of facings (product facing the consumer), the minimum number of rows deep required to create an attractive display, the maximum number of rows deep which will fit in the space allocated to this product, the amount of backroom safety stock (safety stock maintained in a location other than the store shelf), and the date this configuration becomes effective. For example, a product may have three facings, and should have a minimum of one row deep (or three products) to create an attractive display. The maximum number of rows is six, since no more than eighteen products will fit in the space allocated to this product. No additional units should be kept as safety stock in addition to the quantity on the shelf. Another example would be a mattress, where one mattress is kept on the display floor, and another is kept in the back. There is not enough room to store two mattresses on the display floor, but it is important to have two mattresses in stock. If a mattress were not stocked in the back, and someone were to buy the mattress on display, there would be nothing to display until the next shipment from the suppliers or supplier.

Figure 14:
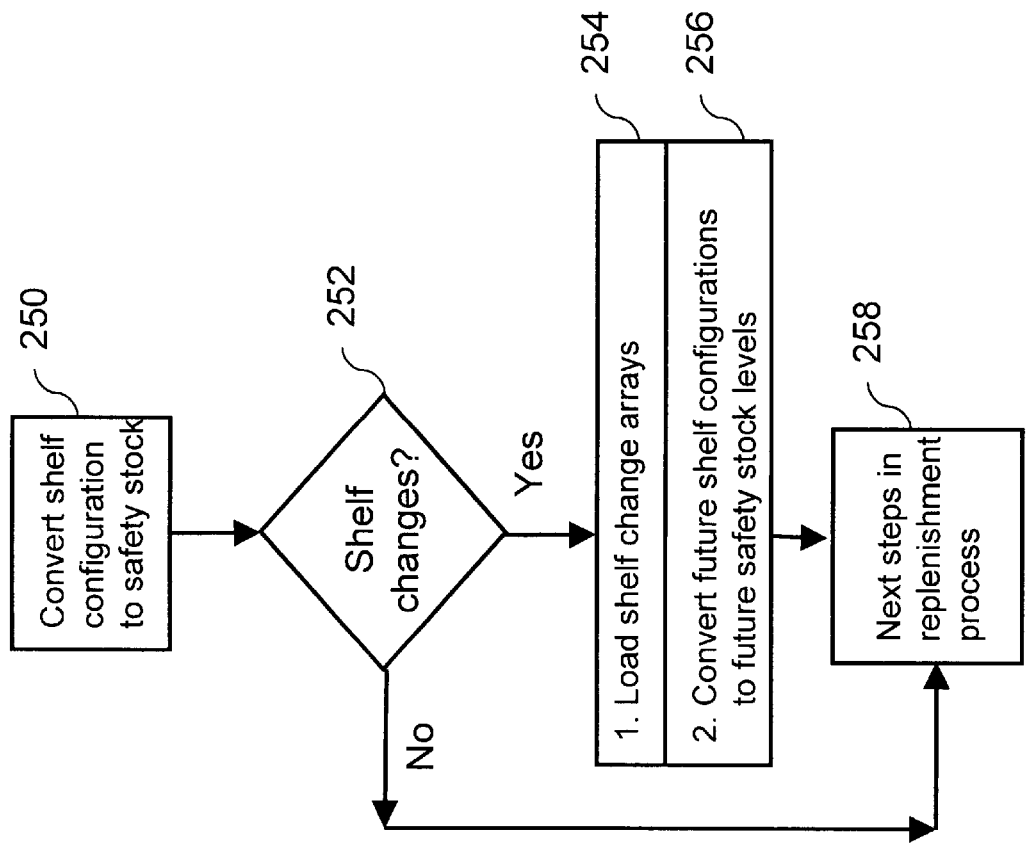
FIG. 14 is a flow diagram illustrating the logic used for converting shelf configuration into safety stock level.

FIG. 14 illustrates the logic in replenishment system 200 for converting shelf configuration into safety stock level. Initially, at step 250, the current shelf configuration is converted into a safety stock level by multiplying the facings by the minimum rows deep needed for an attractive display. Next, at step 252, a determination is made if shelf changes are needed. If there are any future shelf changes, the logic proceeds to step 254 where shelf change arrays are loaded. Next at step 256, these arrays are converted into future safety stock levels, and this second array is later tested as part of the process to determine when to schedule a planned replenishment shipment. After this step, or if there are no future shelf changes step 252, the logic proceeds to step 258. There, the next steps in the replenishment planning process can be executed as discussed below and illustrated in FIG. 15.

Figure 15:
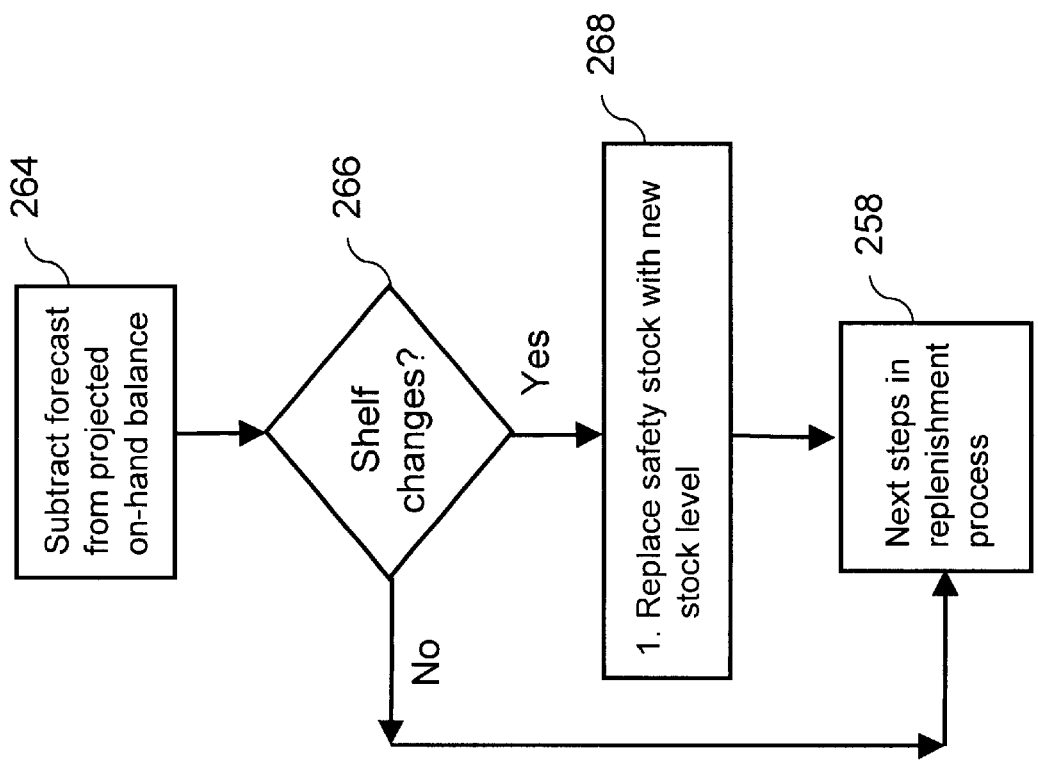
FIG. 15 is a flow diagram illustrating the logic used for updating the safety stock using future safety stock levels.

FIG. 15 illustrates the logic in replenishment system 200 for using future safety stock levels determined at step 256 to update the safety stock. FIG. 15 expands on steps 225 and 226 shown in FIG. 13*a* and discussed above. First, as depicted at step 264, each sales forecast for a product is subtracted from the projected on-hand balance for the product to give the new projected on-hand balance. The sales forecast was loaded from database 36 into transient memory 34 in steps 220 and 222, as shown in FIG. 13*a* and discussed above.

Next, at step 266, a determination is made if there is a shelf change in the future safety stock level from step 256 with a date prior to the forecast which was just subtracted. If so, then the current safety stock is replaced with the safety stock from the future shelf change, as indicated at step 268. After this step, or if there is no such shelf change, then the next steps in the replenishment process are carried out, as depicted by step 258. These steps begin with step 226 shown in FIG. 13*a*.

Group Products

Another feature of system 20 is that several products can be combined and treated as a single entity for both forecasting and replenishment planning. This is useful in several retail situations. One situation is where a product is sold individually and as a group. For example, canned beverages, such as soda or beer, are sold as both six-packs and individual cans. However, planned replenishments are only calculated for six-packs. If individual cans are needed, six-packs are opened and displayed as individual cans. As described in more detail below, system 20 combines the information for both six-packs and individual cans (taking into account the number of cans per six-pack), and does the forecasting and replenishment planning in six-packs.

The same capability can be used in the situation where one product is replaced with another, such as leather gloves from one manufacturer with a similar type of leather gloves from another manufacturer. It is not efficient to calculate the forecasts and planned replenishment shipments on both gloves, and constantly monitor when the old gloves will run out and when the new gloves are needed. System 20 combines information from point of sale (POS) system 90 (FIG. 5), on-hand balances, and quantities in-transit for both the old gloves and the new gloves. Based on these combined numbers, the projected sales of the new gloves is calculated, and this is used to calculate the projected replenishment shipments of new gloves.

Figure 16:
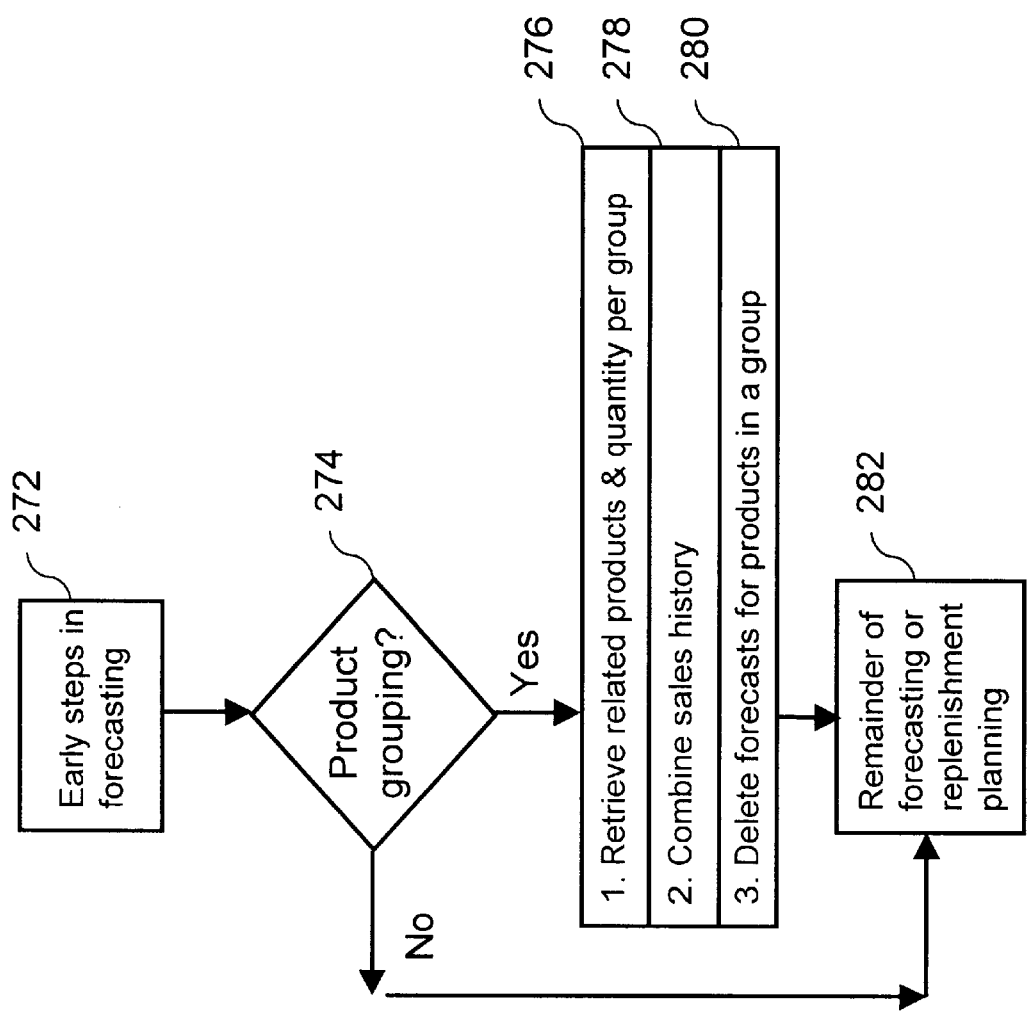
FIG. 16 is a flow diagram illustrating the logic used for handling product groups in forecasting.
Figure 17:
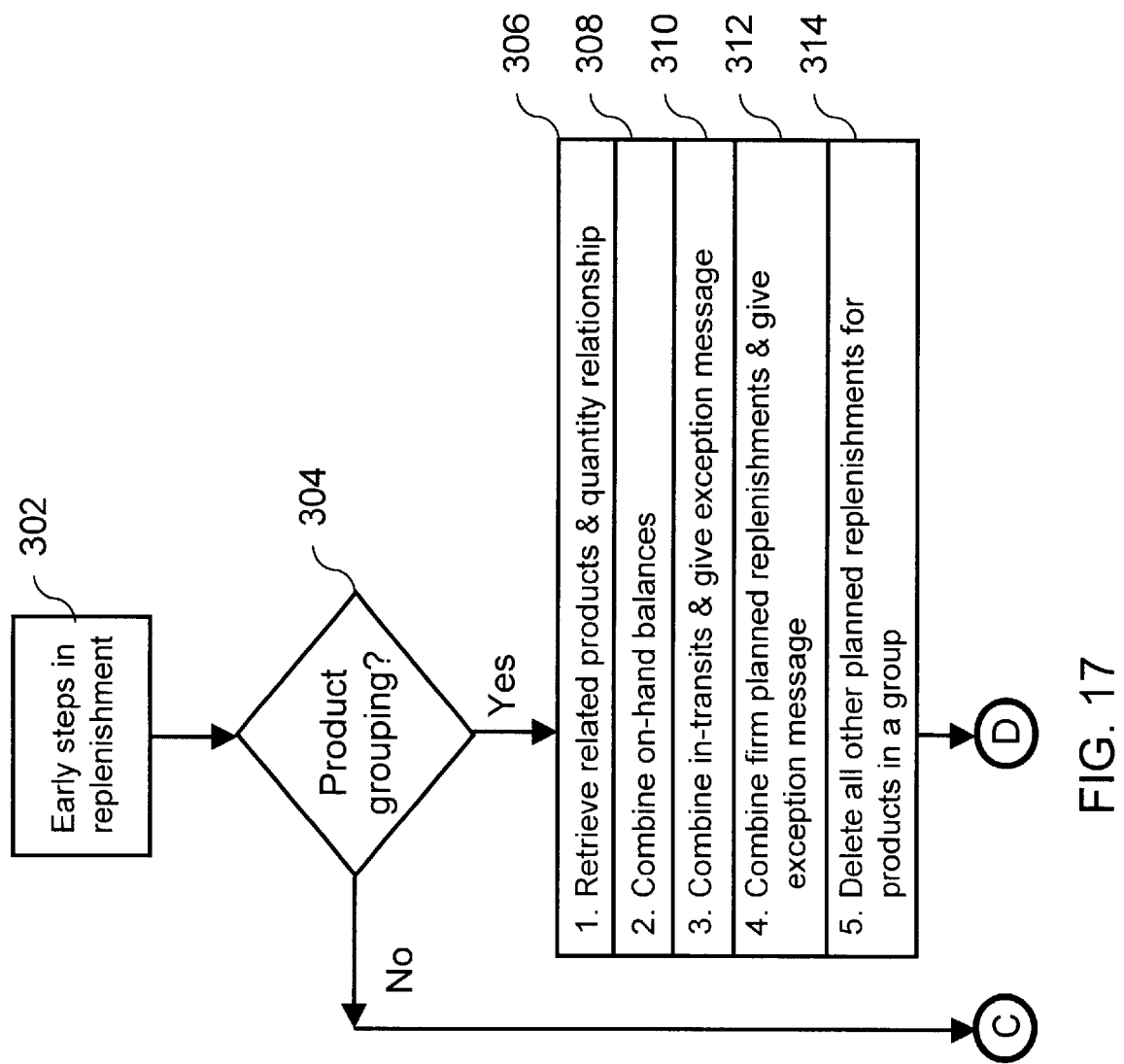
FIGS. 17 and 18 are sequential flow diagrams illustrating the logic used for handling product groups in replenishment planning.
Figure 18:
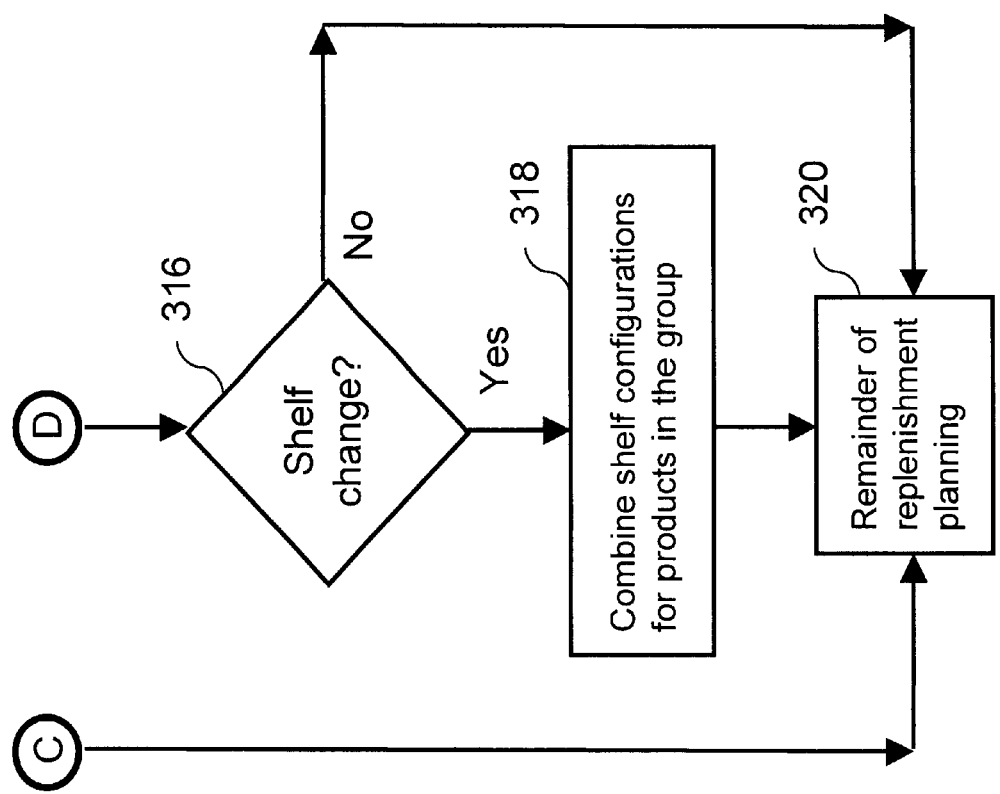

Referring now to FIG. 16, the product group logic for forecasting is illustrated. Following completion of earlier forecasting steps, such as loading the sales history arrays, which is represented by steps 272, the logic proceeds to step 274. There, a determination is made if a product is the main product in a group, six-packs of beer for example. If so, then at step 276 the logic retrieves the product group information listing the different products in the group. In this example, individual cans of beer are part of the group headed by six packs of beer and the quantity relationship is equal to ⅙. Next, at step 278, sales history i.e., POS data from POS system 90, is combined for all the products in the group based on the quantity relationship.

Then, at step 280, forecasts for products in a group are deleted. Forecasts should only exist for the main product in the group, six-packs of beer in this example. Any forecasts for six-packs of beer would remain as this is the main product in the group, and the product where the forecast resides.

At this point, or if at step 274 a determination is made that there are no product groupings, then the forecasting arrays contain the correct information and, as represented by step 282, the remainder of the forecasting can proceed in the same way as for a single product. This would include replacing promotion weeks and weeks with abnormal demands with substitute values, calculating trend, and so on.

Referring next to FIGS. 1, 2, 17 and 18, the logic for handling product groupings in the replenishment system 200 is illustrated. After completing earlier steps in the replenishment process, e.g., the steps illustrated in FIG. 13*a* step 220, as depicted by step 302, a determination is made at step 304 if a product is the main product in a group. If so, logic retrieves the product group information in the same manner as explained above for forecasting, as indicated by step 306. Next, at step 308, on-hand balances for all products in the group are combined based on the quantity relationship. In-transit quantities (quantities in transit from a supplier 24 such as a retain distribution center) to a retail store 23 are combined, as depicted by step 310, based on the quantity relationship. An exception message is given notifying the analyst that an in-transit exists for products in the group. (Exception messages are described in more detail below.) Generally, this is not expected and so it is appropriate to generate an advisory exception message. For example, it would not be typical to have individual cans of beer in transit from supplier 24 to retail store 23. Similarly, if one product is being replaced by another product, it is not expected to have a quantity of the old product in-transit to the store. Normally, there will be a quantity of the old product on-hand, and all shipments to the store would be for the new product.

Then, at step 312, firm planned replenishment shipments are combined based on the quantity relationship. Firm planned replenishment shipments are shipments planned to be shipped at a future date and which have been manually overridden by a planner or analyst. These planned replenishment shipments are not changed by the normal replenishment logic. An exception message is given notifying the analyst that a firm planned replenishment shipment exists for products in the group. For example, if one product is being replaced by another product, a planner or analyst may have decided to distribute the remaining inventory of the old product at supplier 24 (a retail distribution center for example) to retail stores 23. However, these shipments must be done in the future since retail stores 23 have no room to store the products at the present time.

Next, at step 314, any planned replenishment shipments which are not firm (i.e., overridden by a planner or analyst) are deleted. Planned replenishment shipments should only exist for the main product in the group, except in the case of firm planned replenishments as explained above. Any planned replenishment shipments for six-packs of beer would remain as this is the main product in the group, and the product where the replenishment plan resides.

At step 316, a determination is made if a change in the store shelf configuration exists for any of the products in the group. If so, at step 318 the shelf configurations for all the products in the group are combined based on the quantity relationship. An example of a change in the store shelf configuration would be an increase in the six-packs of beer and/or an increase in the number of individual cans of beer in a cooler.

At this point, the planning arrays contain the correct information and the remainder of replenishment planning can proceed in the same way as for a single product, as illustrated by step 320, and also depicted in FIG. 13b at step 225.

Promotions

Another feature of replenishment system 200 of the invention is the processing for promotional replenishments. Three types of promotional forecasting and replenishment calculations are done.

Calculation of an initial distribution of promotional products.

Calculation of an increased safety stock level during the promotion.

Recalculation of the promotional sales forecast and planned replenishment shipments each day during the promotion.

Figure 19:
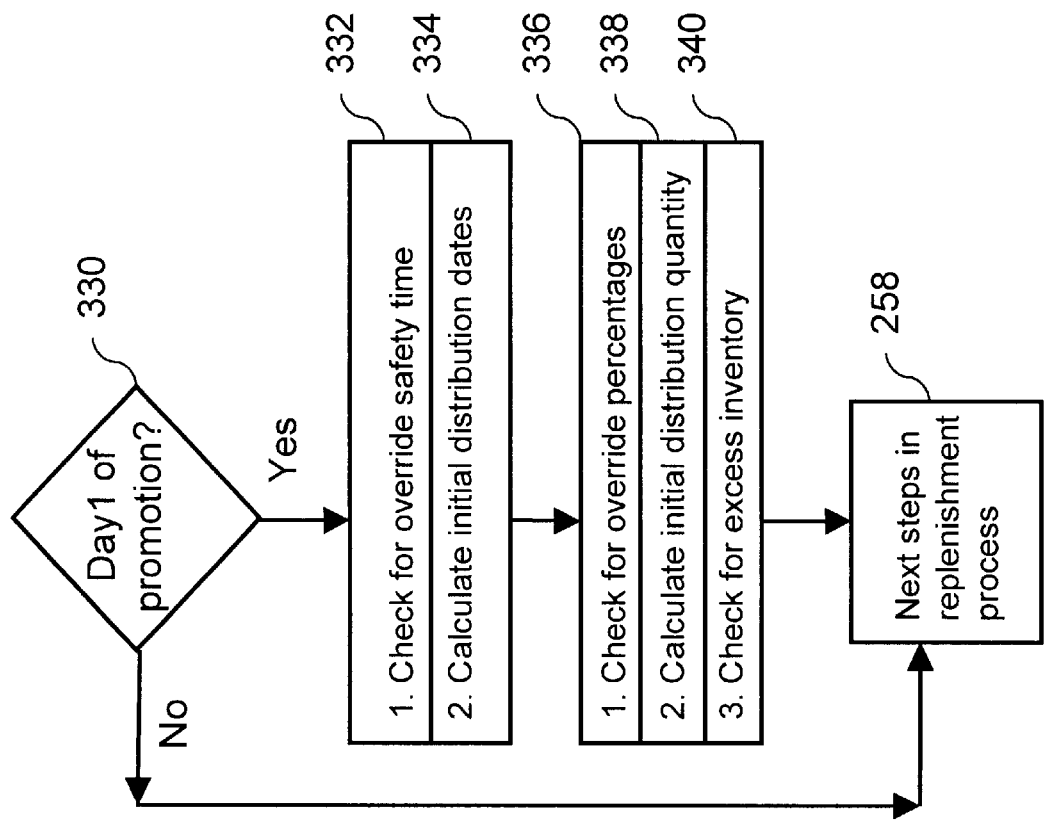
FIG. 19 is a flow diagram illustrating the logic used for determining the initial distribution of products for the first day of a promotion.

FIG. 19 depicts alternate logic to that represented in steps 227 and 228 in FIG. 13b which is used for calculating the initial distribution of products to a retail store 23 for the first day of a promotion. The initial distribution is the planned replenishment shipment which arrives at a retail store 23 some number of days before the promotion begins.

If it is determined at step 330 that the forecast to be used in replenishment planning is the first daily forecast of a promotional forecast, then the initial distribution logic is called. If not, the next steps in the replenishment process are performed, as indicated by step 258 and as described above. The initial distribution logic is not used for non-promotional forecasts, and it is not used for promotional forecasts in day 2, through the end of the promotion.

The first step in the initial distribution determination is to check for override initial distribution safety times, as indicated by step 332. A safety time is the number of days before the promotion starts when the replenishment shipment should arrive at the store. Replenishment system 200 permits users to specify an initial distribution safety time at several levels. This allows planners or analysts to tailor the system to their unique promotional needs. For example, replenishment system 200 permits users to set a system-wide initial distribution safety time specifying that the initial distribution for a promotion should arrive at the store three days before the promotion starts. Additionally, users can specify a different initial distribution safety time that would apply only to certain categories of products, say four days for video games. The users of the system can also specify that a certain product at a certain location, (such as retail store 23) or a supplier 24 that is a retail distribution center, can have an initial distribution safety time. If an initial distribution safety time were specified for a product/ location, it will override the system-wide initial distribution safety time and/or the initial distribution safety time for a category of products. Finally, an initial distribution safety time can be specified for a specific promotion for a specific product at a specific location, and this initial distribution safety time will override all other initial distribution safety times.

Next, at step 334, the ship date and the receipt date for the initial distribution replenishment shipment is calculated. The receipt date is when the shipment would be received at retail store 23, and is calculated as the first day of the promotion less the safety time. This date is then adjusted based on the days the store can receive deliveries. For example, if the calculated receipt date is June 20, but the store only receives shipments on June 19 and June 21, then the receipt date would be moved up to June 19. The ship date is the date when the shipment would be shipped from the supplier 24 and is the receipt date less the lead time to pick, transport, and receive the shipment.

At step 336, a check is made for override percentages. This is similar to the check for override safety times at step 332. Replenishment system 200 allows users to specify an override percentage at several levels. This allows planners or analysts to tailor the system to their unique promotional needs. For example, replenishment system 200 permits users to set a system-wide percentage specifying that 50% of the expected promotional sales should be shipped to the store as an initial distribution quantity. Additionally, users can specify a different percentage that would apply only to certain categories of products, say 100% for small fishing lures. The users of the system can also specify that a certain product at a certain location (retail store 23 or supplier 24) can have a percentage that would override the system-wide percentage and/or the percentage for a category of products. Finally, a percentage can be specified for a specific promotion for a specific product at a specific location, and this percentage will override all other percentages.

Then, at step 338, an initial distribution quantity is calculated based on the percentage calculated above. The total promotional forecast is multiplied by the percentage to give the size of the initial distribution shipment.

Next, at step 340, a check is made for excess inventory. Retail store 23 may have excess inventory on hand from a prior promotion. In such a case, no initial distribution is needed and so a planned replenishment shipment would not be created. Finally, the next steps in the replenishment process are performed, as depicted by step 258 and described above.

Replenishment system 200 switches from safety stock to safety time during a promotion. As explained above, safety time means having a shipment arrive at retail store 23 or suppliers 24 a specified number of days before it is needed, two days for example. Safety stock means having a shipment arrive at retail store 23 when the inventory is projected to drop to a specific number of units, ten for example. The goal in both cases is to prevent retail store 23 or supplier 24 from going out of stock when demands occur which are greater than the forecast. Safety time is a better way to deal with demands that vary greatly (such as promotions), since it has the effect of adjusting the safety stock level automatically. However, safety stock levels are better suited to the normal non-promotional demand at a retail store because the safety stock is based on the number of products needed to provide an attractive display. By providing the ability to switch the safety stock policy and allow safety stock on non-promotional demands and simultaneously allow safety time for promotional demands, the most appropriate methods are used for each type of demand.

Figure 20:
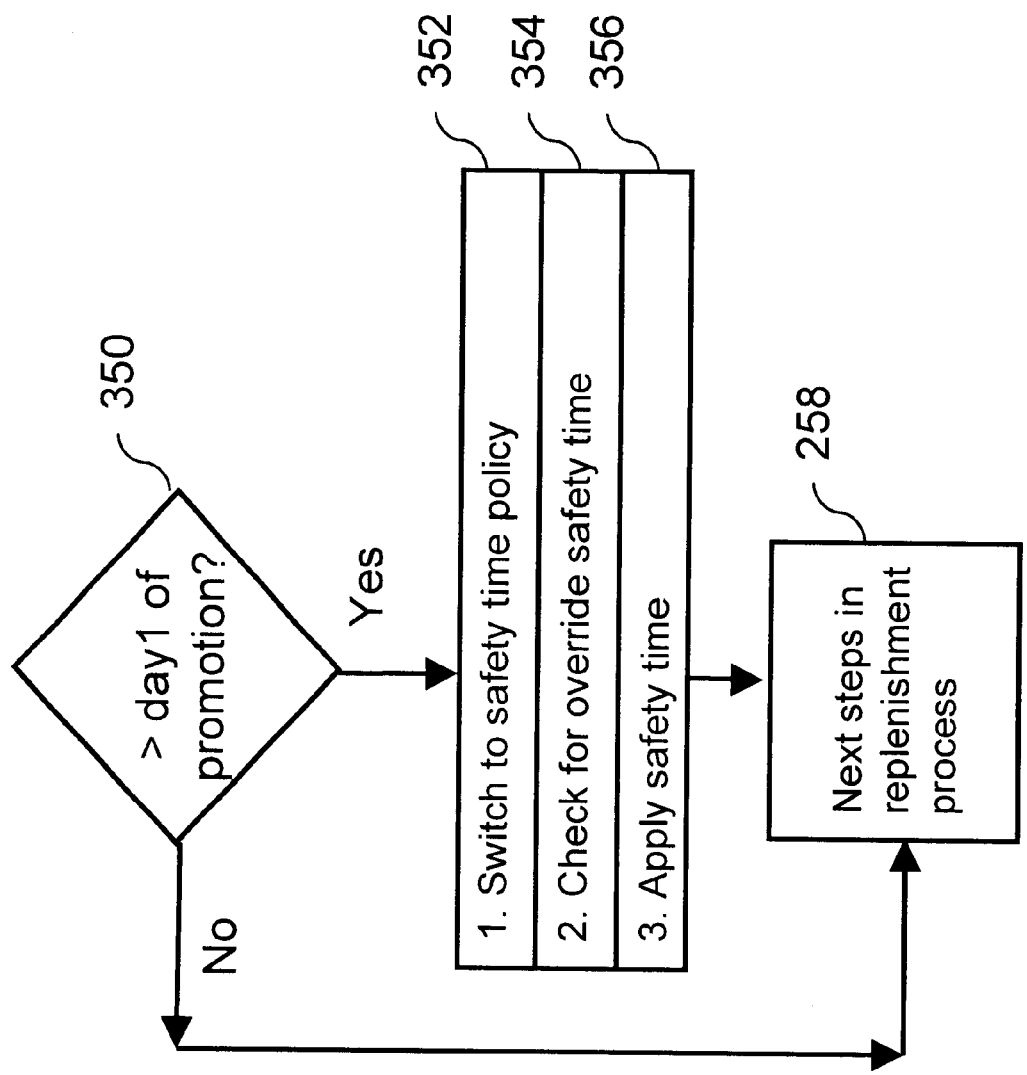
FIG. 20 is a flow diagram illustrating the logic used for determining the distribution of products on other than the first day of a promotion.
Figure 21:
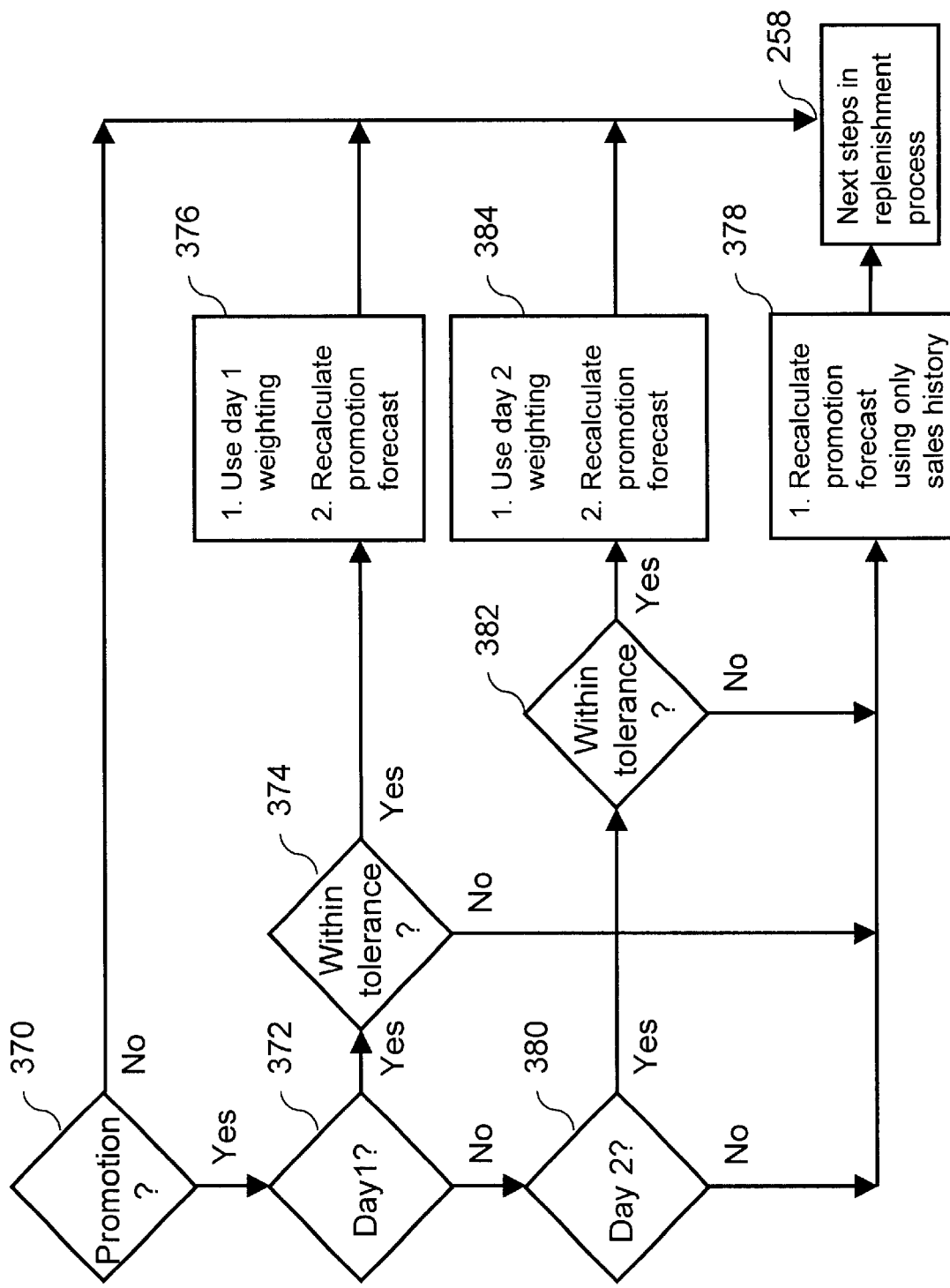
FIG. 21 is a flow diagram illustrating the logic used for re-projecting the promotion forecast and then subsequently re-projecting the planned replenishment shipments during a promotion.

FIGS. 20 and 21 depict an elaboration of step 220 in FIG. 13a, specifically the loading of the forecast arrays for promotion forecasts. Referring to FIG. 20, at step 350 a check is made to see if the day is during a promotion, but other than the first day If it is the first day of the promotion, then the next steps in the replenishment process are carried out, as depicted by step 258 (loading the other arrays in step 220 on FIG. 13a). If a forecast is a promotional forecast other than the first day of a promotion, then safety time is used instead of safety stock for this forecast, as shown by step 352.

Next, at step 354, a check is made for override promotion safety times. The promotion safety time is a different safety time from the initial distribution safety time. As with the initial distribution safety time, replenishment system 200 permits users to specify an override promotion safety time at several levels, again allowing planners or analysts to tailor the system to their unique promotional needs. For example, replenishment system 200 permits users to set a system-wide promotion safety time specifying that planned replenishment shipments during a promotion should arrive at retail store 23 two days before the inventory is projected to reach zero. Additionally, users can specify a different promotion safety time that would apply only to certain categories of products, say 3 days for a group of fashion items. The users of the system can also specify that a certain product at a certain location (retail store 23 for example) can have a promotion safety time that would override the system-wide promotion safety time and/or the promotion safety time for a category of products. Finally, a promotion safety time can be specified for a specific promotion for a specific product at a specific location, and this promotion safety time will override all other promotion safety times.

Then the correct safety time selected above is applied, as shown by step 356. Finally, the remainder of the replenishment process is carried out in the same manner as for nonpromotional periods, as shown by step 258 and described above.

For many retailers, there is enough time to get early sales information about a promotion, recalculate the promotion forecast, recalculate the planned replenishment shipments, and ship revised replenishment shipments to retail stores 23. Replenishment system 200 is designed to permit such recalculation. As a consequence, the inventory at suppliers 24 is better deployed. Frequently, one retail store 23 will experience an increase in sales compared to forecast, while another store experiences a decrease in sales compared to forecast. In these situations, by recalculating the promotion forecast and recalculating the planned replenishment shipments, the inventory is sent to retail stores 23 that need it, and not sent to the stores which do not. The result is improved service levels, and the reduction of excess inventory.

The process for re-projecting the promotion forecast, and then subsequently re-projecting the planned replenishment shipments during a promotion is illustrated in FIG. 21. First at step 370, a determination is made if a forecast is a promotion forecast, and the current date is within the promotion period, and there is sales history (point of sale data for one or more days during the promotion period). If not, then, as illustrated by step 258, the next steps in the replenishment process are followed. If so, then the promotion is re-forecast based on the available sales data.

If sales history exists for the first day of the promotion, but not for the second or later days, as determined at step 372, then the sales history is compared to user-specified forecast error tolerances, as shown at step 374. Tolerances exist for selling more than the forecast, and also for selling less than the forecast. Assuming the sales history falls within tolerances, the sales history is compared to the forecast by extrapolating the first day's sales history to give the estimated forecast for the entire promotional period. For example, assuming the first day of the promotion was expected to sell 14% of the total for the promotion, and 10 were sold, the extrapolated number for the week would be 140. Assuming the sales history falls within the tolerances, the extrapolated sales history is combined with the original promotional forecast using user-specified weights, as illustrated in step 376. For example, the original forecast might be weighted at 40% and the extrapolated sales history might be weighted at 60%. Using these values, a revised promotional forecast is calculated for the product and store combination, also at step 376. If the extrapolated sales history exceeds the tolerances, the original forecast is ignored and extrapolated sales history is used as the new promotional forecast, as illustrated by step 378.

If sales history exists for the first and second day of the promotion, but not for later days, as determined at step 380, then the sales history is compared to the user-specified forecast error tolerances at step 382. The first two days sales history is extrapolated to give the estimated forecast for the entire promotional period. If this is within the tolerances, then at step 384 the extrapolated sales history is combined with the original promotional forecast using a second set of user-specified weights to give a revised promotional forecast for the product and store combination. For example, the original forecast might be weighted at 20% and the extrapolated sales history might be weighted at 80% to give a revised promotional forecast for the product/location combination.

If the extrapolated sales history exceeds the tolerances, the original forecast is ignored and extrapolated sales history is used as the new promotional forecast, depicted by step 378.

If at step 380 it is determined that sales history exists for the third day of the promotion, then the original forecast is ignored and extrapolated sales history is used as the new promotional forecast, per step 378. Once the forecast has been recalculated at steps 376, 378 or 384, the next steps in the replenishment planning process can happen as with any other time period (promotional or non-promotional), as illustrated by step 258.

Financial Planning

Referring to FIG. 2, another feature of system 20 is its financial planning system 400. Financial planning system 400 is typically used by financial planners to more accurately estimate what is likely to happen in the future, and compare this projection to various budgets and other financial data. Financial planning system 400 multiples the projected sales forecasts by the selling price of the products and the cost of the products. This results in a projected financial plan showing the projected sales dollars, the projected cost of goods for those sales, and consequently the projected gross margins. Financial planning system 400 also multiplies the projected replenishment shipments are multiplied by the cost of the products. This results in a projection of purchases, useful in cash flow planning. Using projected sales forecasts, financial planning system 400 calculates a projected inventory. This is also multiplied by the cost of the products, resulting in a projected inventory investment in dollars, also useful in cash planning.

Exception Messages and User Interface

Figure 22:
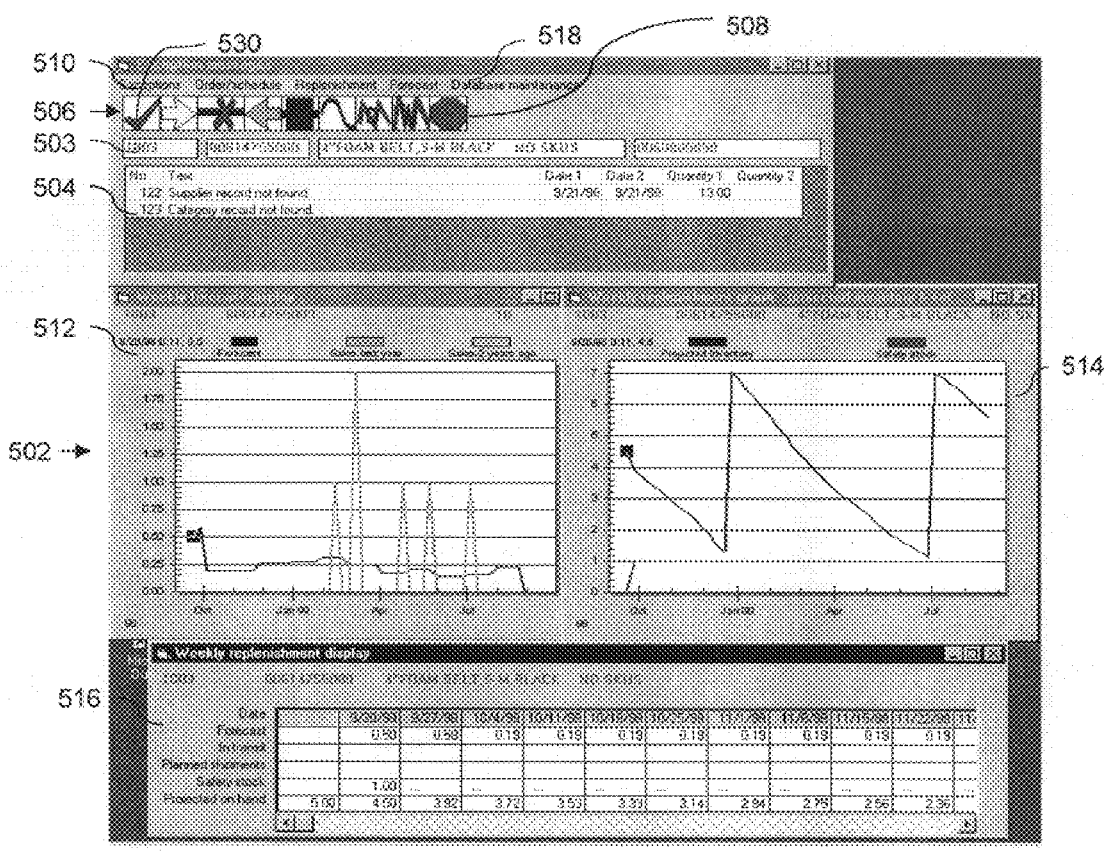
FIG. 22 illustrates a screen display of the system containing information for a retail store at the top level of the supply chain.

Another important aspect of system 20 is exception generator 500. The latter generates exception messages that direct an analyst's attention to a situation which requires action, without requiring the person to scan large amounts of information. For example, an exception would be given for in-transit shipments projected to arrive later than when they are needed. It is more efficient for someone to review the exception messages for the few products which are projected to arrive later than needed, than to scan the on hand balances, forecasts, and in-transits for all products. FIG. 22 illustrates the primary user display 502 for a product at the level of retail store 23. Display 502 is designed to allow an analyst to quickly visualize the situation on a product or group of products identified at 503. Top section 504 of display 502 shows all exception messages for this product or group of products.

A feature of exception generator 500 is that all the exception messages for a product are grouped together. This way the analyst can see the entire situation, rather than returning to the same product over and over for each exception, and seeing only a portion of the situation each time.

An additional feature, related to the grouping of exception messages for a product, is the prioritization of these blocks of exception messages. Exception generator 500 permits users to set the priority of the different exception messages, so that what is important to them will appear first, and what they consider least important will appear last. The blocks of exception messages are sorted using this user specified priority. This way, if an analyst is unable to get through all the exception messages, the important ones will have been reviewed, and the least important exception messages can be reviewed at another time.

Primary user display 502 is designed to permit the analyst to obtain additional information quickly and easily. Icons 506 on tool bar 508 provide a number of different graphs and spreadsheet displays, as does drop-down menu 510. The example in FIG. 22 shows a weekly forecast graph 512, a weekly replenishment graph 514, and a weekly replenishment spreadsheet 516. The weekly forecast graph shows sales from prior years, as well as the forecast. The analyst can zoom in on the graph 512 to display more detail where necessary. The weekly replenishment graph 514 shows the projected inventory level illustrating the "sawtooth" curve showing the impact on inventory where shipments are projected to be received increasing the inventory and where sales gradually reduce the inventory level to near the safety stock level. The weekly replenishment spreadsheet 516 shows the same information in a spreadsheet format. Rows on the spreadsheet show the forecast, any quantities in-transit to retail store 23 from supplier, projected replenishment shipments, the safety stock level, and the projected on-hand balance.

The analyst can maintain database 36 without leaving this display. The database maintenance drop-down menu 518 allows access to the different database tables. This would be used, for example, to correct the missing or incorrect category record. In this case, an exception message exists for a category record not found.

When an analyst is done with a product or group of products, clicking the check mark icon 530 will delete all the exception messages for the product or group of products, and advance to the next product in priority sequence. Other icons 506 exist to skip over all exceptions (so they can be reviewed at another time), or to delete one or more exception messages, but retain others for later review or as a reminder of some action that should be taken.

Exception generator 500 is designed to permit exception messages to be tailored to the unique needs of each retail organization. In some cases, retailers may not wish to create exception messages of a certain type. For example, fashion analysts or planners may not wish to see exception messages for short sales history, where hardware analysts or planners might choose to see these messages. In the case of a fashion analyst or planner, exception generator 500 permits a user to turn off the short sales history message. This way the exception message is never produced, and valuable processing time is not wasted creating and then hiding this message.

Additionally, exception generator 500 permits exception messages to be suppressed, so that the message is created in some circumstances, but not in others. If an analyst has reviewed an exception message for excessive case size, he or she may not wish to see the message again until May when the contract is up for re-negotiation. In this situation, the analyst can click on the suppress icon, and then type in a date. This will prevent the message from being generated so the analyst is not bothered with a message he or she does not wish to see, and valuable processing time is not wasted creating and then hiding the message.

Exception message suppression happens in one of three ways.

The first is suppression based on an end date. For example, the case size example above would have this type of suppression. The exception message would be suppressed until after the contract negotiation date.

A second type of suppression is based on a change in quantity tolerance. For example, if an analyst were to override the forecast, the system will notify him or her of the fact that a forecast override exists. However, once notified, the analyst does not want to see the message again unless something changes beyond the tolerances specified by the analyst.

A third type of suppression is based on a change in date tolerance. For example, if an analyst were to override a planned replenishment shipment giving it a date which is earlier than needed because of a probable strike by truck drivers, the system would notify him or her of the fact that the override exists. However, once notified, the analyst does not want to see the message again unless something changes, beyond the tolerances specified by the analyst. For example, if the shipment is now scheduled to arrive later than needed (because the demands for the product have changed).

Figure 23:
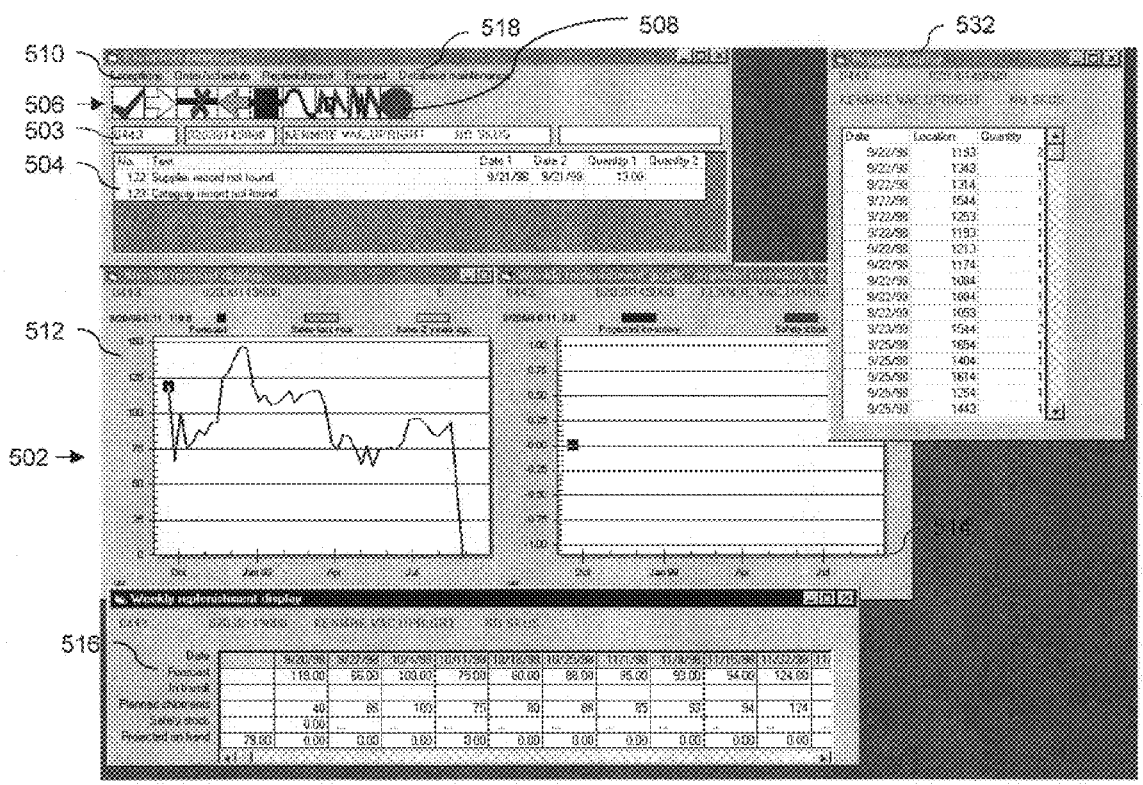
FIG. 23 is similar to FIG. 22, except that it pertains to a supplier at the second level of the supply chain.

FIG. 23 illustrates the primary user 502 display for a product or group of products at the supplier 24. In this situation, the forecast graph shows the sum of the projected replenishment shipments to the stores. In the upper right of FIG. 23, a spreadsheet 532 shows what is called the dependent demand information. This provides a listing by date of the stores creating demand on supplier 24. For example, on Sep. 22, 1998, eleven stores are creating a total demand of twelve on suppliers 24 for this product.

System 20 is sufficiently flexible in its design to permit implementation in various computer systems and networks, as described above. Referring to FIGS. 3 and 4, large corporate users will typically implement system 20 using either the client-server network described above and illustrated in FIG. 3, or a browser-based system as to shown in FIG. 4, where network 54 is an intranet network. This permits product forecasting and replenishment ordering to be performed by a centralized business group, thereby obtaining the benefits of large-volume orders, ready use of standard business processes, and other benefits.

Alternatively, system 20 is adapted for use with small retail stores 23, such as general stores, convenience stores not affiliated with a national chain or franchise, and other independent stores or groups of stores. In many cases, such retail stores 23 lack access to sophisticated forecasting and replenishment planning tools. Also, such retail stores 23 cannot afford to employ a trained analyst to run such tools, given that only a few minutes of an analyst's time would be required in any given day to run the tools. Further, small retail stores, 23 may lack connections to vendors and volume purchasing power that large businesses enjoy.

To address these problems that small and/or independent retail stores 23 face, system 20 may be implemented such that program 26 provides the central application program for a Web-based forecasting and replenishment planning and ordering service. Referring to FIG. 4, when system 20 is implemented to provide such service, network 54 is the Internet or other wide area wired or wireless network, including combination wired and wireless networks. User computers 56 are PCs or other computing devices having a browser for navigating in network 54, and computer 28 is a computer used by the service organization providing the forecasting and replenishment planning and ordering services. For example, user computer 56a may be a PC used by a general store in Vermont, user computer 56b may be a personal digital assistant or other Internet appliance used by a gas station convenience store in Mississippi and user computer 56c may be a wireless set-top box used by large independent bookstore in California. All of these user computers 56 are connected via network 54 to the service provider's computer 28.

Turning now to FIGS. 3–5, at the end of each business day, sales information is downloaded from point of sale system 90 on user computer 56 at retail store 23 via network 54 to the service provider's computer 28. System 20 at the service provider then performs the forecasting, replenishment planning and replenishment ordering, described above, for retail store 23. This service can be provided using analysts trained on system 20, given the overall volume of products and locations being planned. Because the service provider is typically providing such services for a large number of retail stores 23, it can transmit the projected schedule of planned replenishment shipments to the various manufacturers 25 (the third level in the supply chain in many instances, such as a manufacturer's distribution center). This reasonably accurate projection of future purchases by the next higher level in the supply chain, e.g., supplier 24 at level 2 (perhaps a retail distribution center in this example) allows manufacturer 25 to provide higher levels of customer service with less inventory and higher productivity beause there are fewer "surprises." As a result, manufacturer 25 typically provides discounts in exchange for this information. This is in addition to the significant advantages provided by system 20 itself, as discussed above. As a consequence, small, independent retail stores 23 are able to have access to the same systems and system benefits as large chain stores and franchises.

Most of the processing for system 20 is done in large batch processing runs, typically in the middle of the night. This includes updating the on-hand balance through the perpetual inventory system 92, recalculating forecasts in the forecasting system 100, and recalculating planned replenishment shipments in the replenishment system 200. In the course of this processing, the processes described above are used to meet the needs of retail organizations. An important advantage of the present time-phased planning system 20 is that forecasting of projected sales and determination of projected replenishment shipments for a very large number of products (100–400 million product/location combinations) may be achieved using a computer 28 (FIG. 2) that is relatively inexpensive and is of relatively limited computing capacity. For example, benchmarking of system 20 was performed using a server manufactured by Dell Computer Corporation having two 500 MegaHertz microprocessors sold by Intel Corporation under the trademark PENTIUM and having the X86 instruction set used in such microprocessors sold in the year 2000, and 1 Gigabytes of transient memory. The benchmarking revealed that system 20 is capable of forecasting projected sales one year into the future for 50,000 products, each having an associated location, e.g., retail store 23, where net changes occurred for 15,000 product/location combinations using 715,000 associated sales history records, and generating the appropriate exception messages, in about 10 minutes, assuming an average of 50–60% utilization of the microprocessors over the entire forecasting process. As used herein, including in the claims, "net change" means recalculation of a forecast or planned replenishment shipment with respect to a given product/location combination when something has occurred to render the prior forecast or planned replenishment shipment invalid. In addition, the benchmarking revealed such computer can recalculate the planned replenishment shipments one year into the future for such product/location combinations using the sales forecasts referenced above and generate the appropriate exception messages in about 10 minutes, assuming an average of 50–60% utilization of the microprocessors over the entire replenishment planning process. Given the relatively limited periods of time generally available to perform the processes described above, system 20 provides a highly cost efficient approach to forecasting and replenishment planning and ordering in a retail store supply chain.

New forecasts are typically generated in any given day for only some of the products stored in database 36. However, the forecast that forecasting system provides for any given day covers all products stored in database 36, not just those where a net change occurred. For products with respect to which a net change did not occur, the last-generated forecast is used. It is also to be appreciated that replenishment system 200 does typically perform replenishment planning with respect to just the set of products that underwent a net change in connection with generation of the forecast used by the replenishment system. Rather, any products in the total set of products in database 36 may undergo replenishment planning, although typically not all such products. For example, using the product quantities specified in the benchmarking study above, replenishment system 200 typically does not perform replenishment planning with respect to all 15,000 product/location combinations undergoing a net change during forecasting. However, the product/location combinations subjected to replenishment planning are drawn from the 50,000 product/location combinations available.

While the present invention has been described in connection with a preferred embodiment, it will be understood that it is not so limited. On the contrary, it is intended to cover all alternatives, modifications and equivalents as may be included within the spirit and scope of the invention as defined in the appended claims.

What is claimed is:

1. A computer-implemented system for determining time-phased product sales forecasts and projected replenishment shipments for a retail store supply chain using product sales history records generated by retail stores in the supply chain, the system comprising:

a) a forecasting system that determines projected sales of a first plurality of products for a retail store in the supply chain using the product sales history records for said retail store, wherein said first plurality of products is a subset of a second plurality of products that is larger than said first plurality of products and said projected sales are determined in accordance with a first benchmark;

b) a replenishment system that determines first projected replenishment shipments of products to said retail store from a first entity in the retail store supply chain using said projected sales determined by said forecasting system, wherein said first projected replenishment shipments are determined in accordance with said first benchmark; and c) wherein said first benchmark comprises determining (i) said projected sales for one year in the future in a first time period and (ii) said first projected replenishment shipments for one year in the future in a second time period, when said first plurality of products is 15,000 in number, said second plurality of products is 50,000 in number, the product sales history records are 715,000 in number, there is a net change for only said first plurality of products, and said projected sales and said first projected replenishment shipments are determined using a computer capable of executing, in either of said first time period and said second time period, no more than an equivalent number of instructions to what can be executed by a computer having two X86 instruction set microprocessors, one gigabit of transient memory and at no more than an average of 60% utilization of said two microprocessors, in either of said first time period and said second time period, wherein if said forecasting system and said replenishment system are caused to operate in accordance with said first benchmark said first time period and second time period are each less than 20 minutes.

2. A system according to claim 1, further wherein said replenishment system determines second projected replenishment shipments of products to said first entity by a second entity in the supply chain using said first projected replenishment shipments.

3. A system according to claim 1, wherein said first time period and said second time period are each 10 minutes or less.

4. A system according to claim 1, further including a computer system having a CPU, memory and a user interface.

5. A system according to claim 1, further wherein said forecasting system determines said projected sales for said second plurality of products.

6. A system according to claim 1, wherein said forecasting system determines said projected sales as a function of changes in date, relative to preceding years, of a holiday that impacts shopping patterns.

7. A system according to claim 1, wherein said forecasting system determines said projected sales by shifting sales history records for said holiday from a first week in a preceding year in which said holiday fell to a second week in the current year in which the holiday falls, and using a calculation of sales history to fill in sales history records for said first week that were shifted to said second week.

8. A system according to claim 1, wherein said forecast system determines said projected sales by smoothing product demand over time, further wherein said forecast system eliminates smoothing of product demand during a specified time period proximate a holiday that affects shopping patterns.

9. A system according to claim 1, wherein said forecasting system determines said projected sales within a weekly time period by allocating greater projected sales to certain days of the week, further wherein said forecasting system includes an override for reallocating said greater projected sales to selected days proximate a holiday where increased sales are expected to occur based on proximity of said selected days to the holiday.

10. A system according to claim 1, wherein said replenishment system determines said projected replenishment shipments for a product as a function of time-phased safety stock, which is determined as a function of shelf space configuration information for said product.

11. A system according to claim 1, wherein said forecasting system determines said projected sales by grouping selected different products together and treating them as a single product.

12. A system according to claim 1, wherein said replenishment system determines said first projected replenishment shipments by grouping selected different products together and treating them as a single product.

13. A system according to claim 2, wherein said replenishment system determines said second projected replenishment shipments by grouping selected different products together and treating them as a single product.

14. A system according to claim 1, wherein said first entity is one of a retail supplier, a satellite supplier, a retail depot, a wholesaler, an independent distributor, a manufacturer's supplier or a manufacturer's plant, and said second entity supplies products to said one first entity.

15. A system according to claim 1, wherein said replenishment system determines an initial replenishment shipment for a product before a promotion for said product to account for increased demand as a result of said promotion as a function of (a) safety time and (b) percentage of products for said promotion to be provided in said initial replenishment shipment as a function of at least one of (i) retail store location, (ii) product and (iii) promotion, further wherein said replenishment system permits a user to override said safety time and said percentage.

16. A system according to claim 2, wherein said replenishment system determines said first and second projected replenishment shipments as a function of safety stock levels for a first product demand outside of promotional periods for such product and as a function of safety time levels for a second product demand during promotional periods for such product.

17. A system according to claim 2, wherein said forecasting system determines said projected sales for a product during a promotional period for said product on a daily basis using daily sales data generated during said promotional period for said product as a function of whether said daily sales data falls within tolerances and, if so, by generating new projected sales using a weighted combination of said daily sales data and previously determined projected sales for the day on which said daily sales data was generated.

18. A system according to claim 17, wherein said replenishment system determines said first and second replenishment shipments during said promotional period on a daily basis using said daily projected sales for said promotional period determined by said forecasting system.

19. A system according to claim 4, wherein said memory includes transient memory and persistent memory, further wherein data used by said forecasting system to determine said projected sales and data used by said replenishment system to determine said first projected replenishment shipments is stored in said persistent memory in user-selected first time increments, further wherein:

a) said forecasting system determines said projected sales for user-selected time periods in second time increments that are shorter than said first time increments by transferring data from said persistent memory into said transient memory for a user-selected one of said first time increments, and then determines said projected sales for one of said second time increments included within said one of said first time increments using said data stored in said transient memory; and b) said replenishment system determines said projected first and second replenishment shipments for user-selected time periods in second time increments that are shorter than said first time increments by transferring data from said persistent memory into said transient memory for a user-selected one of said first time increments, and then determines said first and second projected replenishment shipments for one of said second time increments included within said one of said first time increments using said data stored in said transient memory.

20. A system according to claim 2, further including an exception generator for generating exceptions to at least one of said projected sales, said first replenishment shipments and said second replenishment shipments, and for displaying said exceptions via said user interface.

21. A system according to claim 20, wherein said exception generator groups together all of said exceptions for a given product, organizes said exceptions in order of criticality for said given product and organizes individual products within a plurality of products in order of criticality of said exceptions for said individual products.

22. A system according to claim 20, wherein said exception generator suppresses exceptions by at least one of end date, product quantity tolerance and date tolerance in accordance with user-provided instructions.

23. A system according to claim 20, further wherein:
a) said forecasting system generates a first visual representation of said projected sales for display by said user interface;
b) said replenishment system generates a second visual representation of said first and second replenishment shipments for display by said user interface;
c) said exception generator generates a third visual representation of said exceptions for display by said user interface;
d) the system includes a visual interface for working with (i) said first, second and third visual representations, and (ii) associated data stored in said memory; and
e) said first, second and third visual representations and said visual interface being simultaneously viewable via said user interface.

24. A system according to claim 2, further including a financial analysis system for performing financial analysis with respect to products in the retail store supply chain using said projected sales, said first replenishment shipments and said second replenishment shipments.

25. A system according to claim 2, further including an MRP system for performing manufacturing resource planning with respect to products to be provided to said first entity based on at least one of said first replenishment shipments and said second replenishment shipments.

26. A system according to claim 1, wherein said replenishment system determines said planned replenishment shipments as a function of at least one of inventory, order quantity rules and shelf configuration.

27. A system according to claim 26, wherein said replenishment system determines said planned replenishment shipments as a function of at least two of inventory, order quantity rules and shelf configuration.

28. A system according to claim 26, wherein said replenishment system determines said planned replenishment shipments as a function of at least three of inventory, order quantity rules and shelf configuration.

29. A system according to claim 26, wherein said replenishment system determines said planned replenishment shipments as a function of inventory, order quantity rules and shelf configuration.

30. A method of determining time-phased product sales forecasts and projected replenishment shipments for a retail store supply chain using product sales history records generated by retail stores in the chain, the method comprising the steps of:
a) determining projected sales of a first plurality of products for a retail store in the supply chain using the product sales history records for said retail store, wherein said first plurality of products is a subset of a second plurality of products that is larger than said first plurality of products and said projected sales are determined in accordance with a first benchmark;
b) determining first projected replenishment shipments of products to said retail store from a first entity in the retail store supply chain using said projected sales, wherein said first projected replenishment shipments are determined in accordance with said first benchmark; and
c) wherein said first benchmark comprises determining (i) said projected sales for one year in the future in a first time period and (ii) said first projected replenishment shipments for one year in the future in a second time period, when said first plurality of products is 15,000 in number, said second plurality of products is 50,000 in number the product sales history records are 715,000 in number, there is a net change for only said first plurality of products, and said projected sales and said first projected replenishment shipments are determined using a computer capable of executing, in either of said first time period and said second time period, no more than an equivalent number of instructions to what can be executed by a computer having two X86 instruction set microprocessors, one gigabit of transient memory and at no more than an average of 60% utilization of said two microprocessors, in either of said first time period and said second time period, wherein if said step a) and said step b) are performed using said first benchmark said first time period and second time period are each less than 20 minutes.

31. A method according to claim 30, further wherein said step b includes the step of determining second replenishment shipments of products to said first entity by a second entity in the supply chain using said first projected replenishment shipments.

32. A method according to claim 30, wherein said first time period and said second time period are 10 minutes or less.

33. A method according to claim 30, wherein said step a involves determining said projected sales as a function of changes in date, relative to preceding years, of a holiday that impacts shopping patterns.

34. A method according to claim 30, wherein said step a involves determining said projected sales by smoothing product demand over time except during a specified time period proximate a holiday that affects shopping patterns.

35. A method according to claim 30, wherein said step b involves determining said projected replenishment shipments for a product as a function of time-phased safety stock, which is determined as a function of shelf space configuration information for said product.

36. A method according to claim 30, wherein said step b involves determining an initial replenishment shipment for a product before a promotion for said product to account for increased demand as a result of said promotion as a function of (a) safety time and (b) percentage of products for said promotion to be provided in said initial replenishment shipment as a function of at least one of (i) retail store location, (ii) product and (iii) promotion, further wherein said replenishment system permits a user to override said safety time and said percentage.

37. A method according to claim 30, wherein said step b involves determining said first and second projected replenishment shipments as a function of safety stock levels for a first product demand outside of promotional periods for such product and as a function of safety time levels for a second product demand during promotional periods for such product.

38. A method according to claim 30, wherein said step a involves determining said projected sales for a product during a promotional period for said product on a daily basis using daily sales data generated during said promotional period for said product.

39. A method according to claim 30, wherein said steps a and b are performed using a computer having a processor, persistent memory, transient memory and a user interface, and data used in said step a to determine said projected sales and data used in said step b to determine said first projected replenishment shipments is stored in said persistent memory in user-selected first time increments, further wherein:
  a) said step a involves determining projected sales for user-selected time periods in second time increments that are shorter than said first time increments by transferring data from said persistent memory into said transient memory for a user-selected one of said first time increments, and then determines said projected sales for one of said second time increments included within said one of said first time increments using said data stored in said transient memory; and
  b) said step b involves determining said projected first and second replenishment shipments for user-selected time periods in second time increments that are shorter than said first time increments by transferring data from said persistent memory into said transient memory for a user-selected one of said first time increments, and then determines said first and second projected replenishment shipments for one of said second time increments included within said one of said first time increments using said data stored in said transient memory.

40. A method according to claim 30, further including the step of generating exceptions as to at least one of said projected sales, said first replenishment shipments and said second replenishment shipments, further wherein all of said exceptions for a given product are grouped together, said exceptions for a given product are organized in order of criticality, and individual products within a plurality of products are organized in order of criticality of said exceptions for said individual products.

41. A method according to claim 40, wherein said exceptions are suppressed by at least one of date, product quantity tolerance and product end date tolerance in accordance with user-provided instructions.

42. A method according to claim 40, further including the steps of:
  a) generating a first visual representation of said projected sales for display by said user interface;
  b) generating a second visual representation of said first and second replenishment shipments for display by said user interface;
  c) generating a third visual representation of said exceptions for display by said user interface; and
  d) visually displaying via said user interface (i) said first, second and third visual representations, and (ii) associated data stored in said memory.

43. A method according to claim 30, further including the step of performing financial analysis with respect to products in the retail store supply chain using said projected sales, said first replenishment shipments and said second replenishment shipments.

44. A method according to claim 30, wherein said step b involves determining said planned replenishment shipments as a function of at least one of inventory, order quantity rules and shelf configuration.

45. A method according to claim 30, wherein said step b involves determining said planned replenishment shipments as a function of at least two of inventory, order quantity rules, shipping schedules and shelf configuration.

46. A method according to claim 30, wherein said step b involves determining said planned replenishment shipments as a function of at least three of inventory, order quantity rules, shipping schedules and shelf configuration.

47. A method according to claim 30, wherein said step b involves determining said planned replenishment shipments as a function of inventory, order quantity rules, shipping schedules and shelf configuration.

48. A computer-implemented system for determining time-phased product sales forecasts and projected replenishment shipments for a retail store supply chain using product sales history records generated by retail stores in the chain, the system comprising:
  a) first means for determining projected sales of a first plurality of products for a retail store in the supply chain using the product sales history records for said retail store, wherein said first plurality of products is a subset of a second plurality of products that is larger than said first plurality of products and said projected sales are determined in accordance with a first benchmark;
  b) second means for determining first projected replenishment shipments of products to said retail store from a first entity in the retail store supply chain using said projected sales, wherein said first projected replenishment shipments are determined in accordance with said first benchmark; and
  c) wherein said first benchmark comprises determining (i) said projected sales for one year in the future in a first time period and (ii) said first projected replenishment shipments for one year in the future in a second time period, when said first plurality of products is 15,000 in number, said second plurality of products is 50,000 in number, the product sales history records are 715,000 in number, there is a net change for only said first plurality of products, and said projected sales and said first projected replenishment shipments are determined using a computer capable of executing, in either of said first time period and said second time period, no more than an equivalent number of instructions to what can be executed by a computer having two X86 instruction set microprocessors, one gigabit of transient memory and at no more than an average of 60% utilization of said two microprocessors, in either of said first time period and said second time period, wherein if said first means and said second means are caused to operate in accordance with said first benchmark said first time period and second time period are each less than 20 minutes.

49. A system according to claim 48, further wherein said second means determines said second replenishment shipments of products to said first entity by a second entity in the supply chain using said first projected replenishment shipments.

50. A system according to claim 48, wherein said first time period and second time period are 10 minutes or less.

51. A system according to claim 48, wherein said second means determines said projected replenishment shipments for a product as a function of time-phased safety stock, which is determined as a function of shelf space configuration information for said product.

52. A system according to claim 48, further including a computer having a processor, persistent memory, transient memory and a user interface, and data used by said first means to determine said projected sales and data used by said second means to determine said first projected replenishment shipments is stored in said persistent memory in user-selected first time increments, further wherein:

a) said first means determines projected sales for user-selected time periods in second time increments that are shorter than said first time increments by transferring data from said persistent memory into said transient memory for a user-selected one of said first time increments, and then determines said projected sales for one of said second time increments included within said one of said first time increments using said data stored in said transient memory; and b) said second means determines said projected first and second replenishment shipments for user-selected time periods in second time increments that are shorter than said first time increments by transferring data from said persistent memory into said transient memory for a user-selected one of said first time increments, and then determines said first and second projected replenishment shipments for one of said second time increments included within said one of said first time increments using said data stored in said transient memory.

53. A computer-readable storage medium containing a computer program executable by a computer, the computer program comprising the steps of:

a) determining projected sales of a first plurality of products for a retail store in a retail store supply chain using product sales history records for said retail store, wherein said first plurality of products is a subset of a second plurality of products that is larger than said first plurality of products and said projected sales are determined in accordance with a first benchmark;

b) determining first projected replenishment shipments of products to said retail store from a first entity in the retail store supply chain using said projected sales, wherein said first projected replenishment shipments are determined in accordance with said first benchmark; and c) wherein said first benchmark comprises determining (i) said projected sales for one year in the future in a first time period and (ii) said first projected replenishment shipments for one year in the future in a second time period, when said first plurality of products is 15,000 in number, said second plurality of products is 50,000 in number, the product sales history records are 715,000 in number, there is a net change for only said first plurality of products, and said projected sales and said first projected replenishment shipments are determined using a computer capable of executing, in either of said first time period and said second time period, no more than an equivalent number of instructions to what can be executed by a computer having two X86 instruction set microprocessors, one gigabit of transient memory and at no more than an average of 60% utilization of said two microprocesses, in either of said first time period and said second time period, wherein if said step a) and said step b) and performing using said first benchmark said first time period and second time period are each less than 20 minutes.

54. A computer-readable storage medium according to claim 53, wherein said step b involves determining said projected replenishment shipments for a product as a function of time-phased safety stock, which is determined as a function of shelf space configuration information for said product.

55. A computer-readable storage medium according to claim 53, wherein said steps a and b are intended to be performed using a computer having a processor, persistent memory, transient memory and a user interface, and data used in said step a to determine said projected sales and data used in said step b to determine said first projected replenishment shipments is stored in said persistent memory in user-selected first time increments, further wherein:

a) said step a involves determining projected sales for user-selected time periods in second time increments that are shorter than said first time increments by transferring data from said persistent memory into said transient memory for a user-selected one of said first time increments, and then determines said projected sales for one of said second time increments included within said one of said first time increments using said data stored in said transient memory; and b) said step b involves determining said projected first and second replenishment shipments for user-selected time periods in second time increments that are shorter than said first time increments by transferring data from said persistent memory into said transient memory for a user-selected one of said first time increments, and then determines said first and second projected replenishment shipments for one of said second time increments included within said one of said first time increments using said data stored in said transient memory.

\* \* \* \* \*